US010728370B2

(12) United States Patent
Sugaya et al.

(10) Patent No.: US 10,728,370 B2
(45) Date of Patent: Jul. 28, 2020

(54) COMMUNICATION DEVICE AND COMMUNICATION METHOD

(71) Applicant: SONY CORPORATION, Tokyo (JP)

(72) Inventors: Shigeru Sugaya, Kanagawa (JP); Takeshi Itagaki, Saitama (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 15/762,421

(22) PCT Filed: Aug. 23, 2016

(86) PCT No.: PCT/JP2016/074554
§ 371 (c)(1),
(2) Date: Mar. 22, 2018

(87) PCT Pub. No.: WO2017/081903
PCT Pub. Date: May 18, 2017

(65) Prior Publication Data
US 2018/0278729 A1 Sep. 27, 2018

(30) Foreign Application Priority Data
Nov. 11, 2015 (JP) ................................ 2015-221249

(51) Int. Cl.
*H04L 29/08* (2006.01)
*H04W 52/02* (2009.01)
(Continued)

(52) U.S. Cl.
CPC ........... *H04L 69/323* (2013.01); *H04W 28/06* (2013.01); *H04W 52/02* (2013.01); *H04W 72/04* (2013.01);
(Continued)

(58) Field of Classification Search
CPC ...... H04L 69/323; H04W 72/04–0406; H04W 76/14; H04W 84/18–22
See application file for complete search history.

(56) References Cited

U.S. PATENT DOCUMENTS

2008/0095072 A1\* 4/2008 Shao ..................... H04W 8/005
370/254
2009/0016376 A1 1/2009 Sawai
(Continued)

FOREIGN PATENT DOCUMENTS

| JP | 2006-295751 A | 10/2006 |
|---|---|---|
| JP | 2009-21710 A | 1/2009 |

(Continued)

OTHER PUBLICATIONS

International Search Report dated Nov. 15, 2016, in PCT/JP2016/074554 filed Aug. 23, 2016.

*Primary Examiner* — Eric Myers
(74) *Attorney, Agent, or Firm* — Xsensus LLP

(57) ABSTRACT

A communication device includes a communication unit configured to transmit a physical layer (PHY) header including two pieces of information for identifying direct link communication. A communication device includes a communication unit configured to receive a PHY header including two pieces of information for identifying direct link communication and receive a portion subsequent to the PHY header on a basis of the two pieces of information. A communication device includes a communication unit configured to transmit a PHY header including two pieces of information for identifying mesh network communication. A communication device includes a communication unit configured to receive a PHY header including two pieces of information for identifying mesh network communication
(Continued)

and receive a portion subsequent to the PHY header on a basis of the two pieces of information.

12 Claims, 23 Drawing Sheets

(51) Int. Cl.
*H04W 84/12* (2009.01)
*H04W 28/06* (2009.01)
*H04W 72/04* (2009.01)
*H04W 84/18* (2009.01)

(52) U.S. Cl.
CPC ............ *H04W 84/12* (2013.01); *H04W 84/18* (2013.01); *Y02D 70/1222* (2018.01); *Y02D 70/142* (2018.01); *Y02D 70/164* (2018.01); *Y02D 70/166* (2018.01); *Y02D 70/168* (2018.01); *Y02D 70/20* (2018.01); *Y02D 70/21* (2018.01); *Y02D 70/22* (2018.01)

(56) References Cited

U.S. PATENT DOCUMENTS

| | | | |
|---|---|---|---|
| 2011/0051746 A1* | 3/2011 | Chang | H04L 1/0052 370/474 |
| 2012/0002587 A1 | 1/2012 | Kito | |
| 2012/0320932 A1* | 12/2012 | Xu | H04B 3/54 370/474 |
| 2013/0128809 A1* | 5/2013 | Wentink | H04L 29/0604 370/328 |
| 2014/0089513 A1 | 3/2014 | Adachi et al. | |

FOREIGN PATENT DOCUMENTS

| | | |
|---|---|---|
| JP | 2009-278557 A | 11/2009 |
| JP | 2010-109939 A | 5/2010 |
| JP | 2012-15778 A | 1/2012 |
| JP | 2014-82756 A | 5/2014 |
| JP | 5774169 B2 | 9/2015 |

* cited by examiner

FIG. 5

| DL Ind. | STBC | UL Ind. | BW | Nsts | ID | | SGI | Coding | MCS | Smoothing |
|---|---|---|---|---|---|---|---|---|---|---|
| | | | | | PID | PARTIAL AID | | | | |

| Aggregation | Length | Response Ind. | Doppler | NDP Ind. | CRC | Tail |
|---|---|---|---|---|---|---|

FIG.6

| MU/SU | STBC | UL Ind. | BW | Nsts | ID | | SGI | Coding | MCS | Beam Ch./ Smoothing |
|---|---|---|---|---|---|---|---|---|---|---|
| | | | | | PID | PARTIAL AID | | | | |

| Aggregation | Length | Response Ind. | DL Ind. | Doppler | CRC | Tail |
|---|---|---|---|---|---|---|

COMMUNICATION DEVICE AND COMMUNICATION METHOD

TECHNICAL FIELD

The present disclosure relates to communication devices and communication methods.

BACKGROUND ART

In recent years, wireless local area networks (LANs) representative of Institute of Electrical and Electronics Engineers (IEEE) 802.11 have been widely used. Further, along with this, wireless LAN compatible products (hereinafter also referred to simply as "communication devices") have also increased. Here, many wireless LAN compatible products are mobile communication terminals. Since mobile communication terminals have limited opportunities to receive power supply from the outside, it is preferable that power consumption be suppressed.

For example, a method of reducing power consumption of a communication device operating as a station (STA) (hereinafter also referred to simply as "STA") by storing information designating a transmission type of communication in a physical layer convergence protocol (PLCP) header is disclosed in Patent Literature 1. Specifically, the information indicating the transmission type is stored in the PLCP header. The STA which has received the PLCP header puts itself in a sleep mode without receiving a portion subsequent to the PLCP header in a case in which the transmission type does not indicate transmission to the STA such as downlink transmission, direct link transmission, or broadcast transmission. Accordingly, the power consumption of the STA is considered to be reduced.

CITATION LIST

Patent Literature

Patent Literature 1: JP 5774169B

DISCLOSURE OF INVENTION

Technical Problem

However, in the method of Patent Literature 1, power consumption related to reception of the PHY header may increase. For example, in the disclosure, since information indicating five transmission types is added to the PLCP header, the size of the PLCP header increases by at least 3 bits. Therefore, a time necessary for a reception process for the PLCP header increases with the increase in size, and the power consumption in the reception process of the PLCP header increases.

In this regard, the present disclosure proposes a mechanism which is capable of suppressing the increase in power consumption related to the reception of the PHY header while reducing the power consumption by optimizing whether or not the portion subsequent to the PHY header is received.

Solution to Problem

According to the present disclosure, there is provided a communication device including a communication unit configured to transmit a frame including a physical layer (PHY) header including two pieces of information for identifying direct link communication.

In addition, according to the present disclosure, there is provided a communication device including a communication unit configured to receive a physical layer (PHY) header including two pieces of information for identifying direct link communication and receive a portion subsequent to the PHY header on a basis of the two pieces of information.

In addition, according to the present disclosure, there is provided a communication method including transmitting, by a communication unit, a frame including a physical layer (PHY) header including two pieces of information for identifying direct link communication.

In addition, according to the present disclosure, there is provided a communication method including: receiving, by a communication unit, a physical layer (PHY) header including two pieces of information for identifying direct link communication; and receiving a portion subsequent to the PHY header on a basis of the two pieces of information.

In addition, according to the present disclosure, there is provided a communication device including a communication unit configured to transmit a frame including a physical layer (PHY) header including two pieces of information for identifying mesh network communication.

In addition, according to the present disclosure, there is provided a communication device including a communication unit configured to receive a physical layer (PHY) header including two pieces of information for identifying mesh network communication and receive a portion subsequent to the PHY header on a basis of the two pieces of information.

In addition, according to the present disclosure, there is provided a communication method including transmitting, by a communication unit, a frame including a physical layer (PHY) header including two pieces of information for identifying mesh network communication.

In addition, according to the present disclosure, there is provided a communication method including: receiving, by a communication unit, a physical layer (PHY) header including two pieces of information for identifying mesh network communication; and receiving a portion subsequent to the PHY header on a basis of the two pieces of information.

Advantageous Effects of Invention

As described above, according to the present disclosure, a mechanism which is capable of suppressing the increase in the power consumption related to the reception of the PHY header while reducing the power consumption by optimizing whether or not the portion subsequent to the PHY header is received is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating a configuration example of signaling information in a PHY header of a frame transmitted by a transmitting device according to the embodiment.

FIG. 6 is a diagram illustrating a configuration example of signaling information in a PHY header of a frame transmitted by a transmitting device according to the embodiment.

MODE(S) FOR CARRYING OUT THE INVENTION

Figure 1:
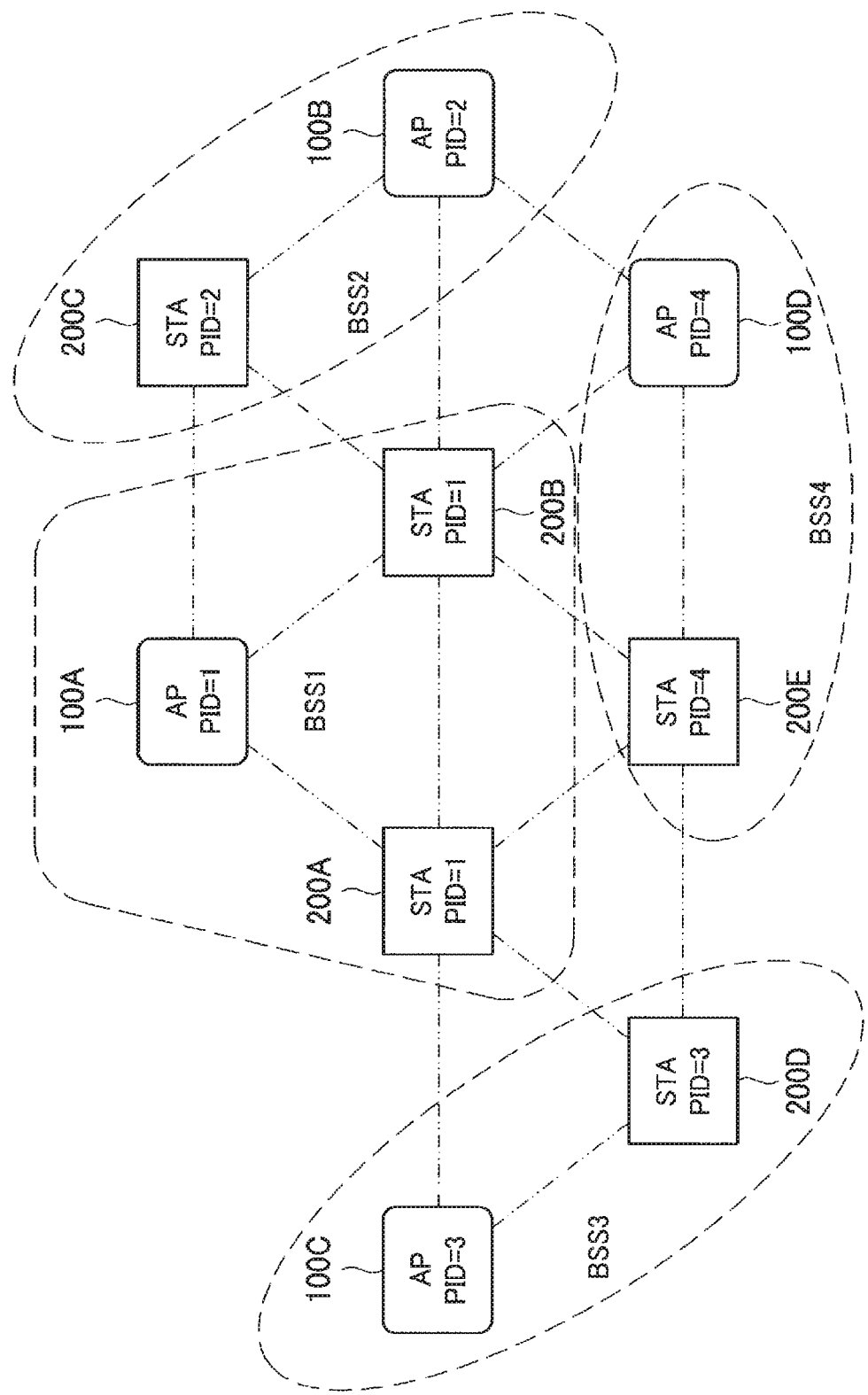
FIG. 1 is a diagram illustrating a schematic configuration of a communication system according to a first embodiment of the present disclosure and an example of setting states of various kinds of information.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like a communication device 100A and a communication device 100B. However, in a case where it is unnecessary to distinguish structural elements having substantially the same function, only the same reference numeral is added. For example, in a case where it is unnecessary to particularly distinguish the communication device 100A and the communication device 100B, they are simply referred to as "communication devices 100."

Further, the description will proceed in the following order.
1. First embodiment (communication using wild card PID)
1-1. System configuration
1-2. Functional configuration of device
1-3. Details of functions of device
1-4. Process of device
1-5. Operation example
1-6. Conclusion of first embodiment
2. Second embodiment (communication using direct link identification information)
2-1. Details of functions of device
2-2. Process of device
2-3. Operation example
2-4. Conclusion of second embodiment
3. Third embodiment (communication using mesh network link identification information)
3-1. Details of functions of device
3-2. Process of device
3-3. Operation example
3-4. Conclusion of third embodiment
4. Application examples
5. Conclusion

1. First Embodiment (Communication Using Wild Card PID)

First, a first embodiment of the present disclosure will be described. In the present embodiment, a PHY header including a wireless communication network identifier (hereinafter also referred to as a "PHY identifier" or a "PID") is communicated, and communication using a second level PID (hereinafter also referred to as a "wild card PID") in which a plurality of first level PIDs (hereinafter also referred to as "normal PIDs") are specified is performed.

1-1. System Configuration

A configuration of a communication system according to a first embodiment of the present disclosure will be described with reference to FIG. 1. FIG. 1 is a diagram illustrating a schematic configuration of the communication system according to the first embodiment of the present disclosure and an example of setting states of various kinds of information.

The communication system according to the present embodiment includes an AP 100 and an STA 200. Specifically, the communication system includes a plurality of APs 100 and a plurality of STAs 200, and a wireless communication network is formed by one AP 100 and one or more STAs 200. For example, as illustrated in FIG. 1, a BSS1 including an AP 100A and STAs 200A and 200B is formed, a BSS2 including an AP 100B and an STA 200C is formed, a BSS3 including an AP 100C and an STA 200D is formed, and a BSS4 including an AP 100D and an STA 200E is formed.

Further, communication ranges of the wireless communication networks in the communication system may overlap those of other wireless communication networks. For example, as illustrated in FIG. 1, since the BSS1 and each of the BSS2 to the BSS4 overlap in the communication range of the AP 100-1 or the STA 200-1, the BSSs can be regarded as overlapping, that is, the BSS1 to the BSS4 can be overlapping BSSs (OBSSs).

In a situation in which there are OBSSs, it is preferable to identify whether communication is communication addressed to one's own BSS or communication addressed to another BSS. Therefore, information identifying the BSS is included in a frame to be transmitted. For example, in the related art, a BSSID is used in a media access control (MAC) layer, and COLOR information of the BSS is used in a PHY layer. Particularly, since the COLOR information is included in the PHY header, in a case in which the COLOR information of one's own BSS is not included, the communication device need not receive the portion subsequent to the PHY header. As a result, the power consumption in the communication device is suppressed.

On the other hand, in the PHY header including the COLOR information according to the related art, it is difficult to transmit a frame to a plurality of BSSs. For example, since a value of the COLOR information of any one BSS is stored in the COLOR information, it is difficult to designate an unspecified BSS or a plurality of BSSs as a destination. Therefore, in the related art, in a case in which an unspecified BSS or a plurality of BSSs are destinations, a PHY header including no COLOR information is used, or a PHY header to which information indicating that an unspecified BSS or a plurality of BSSs are destinations is added is used. However, in the former case, the effect of reducing the power consumption obtained by using the COLOR information is lost, and in the latter case, the communication efficiency is lowered since the size of the PHY header increases.

In this regard, in the communication system according to the present embodiment, a PHY header including a wireless communication network identifier including a second level wireless communication network identifier in which a plurality of first level wireless communication network identifiers are specified is used. Communication devices 100-1 and 200-1, each of which is one of components of the communication system that implements an operation of the communication system, will be described in detail below. Further, for the sake of convenience of description, communication devices according to the first to third embodiments are distinguished by attaching numbers corresponding to the embodiments to the end as in communication devices 100-1 to 100-3.

1-2. Functional Configuration of Device

Figure 2:
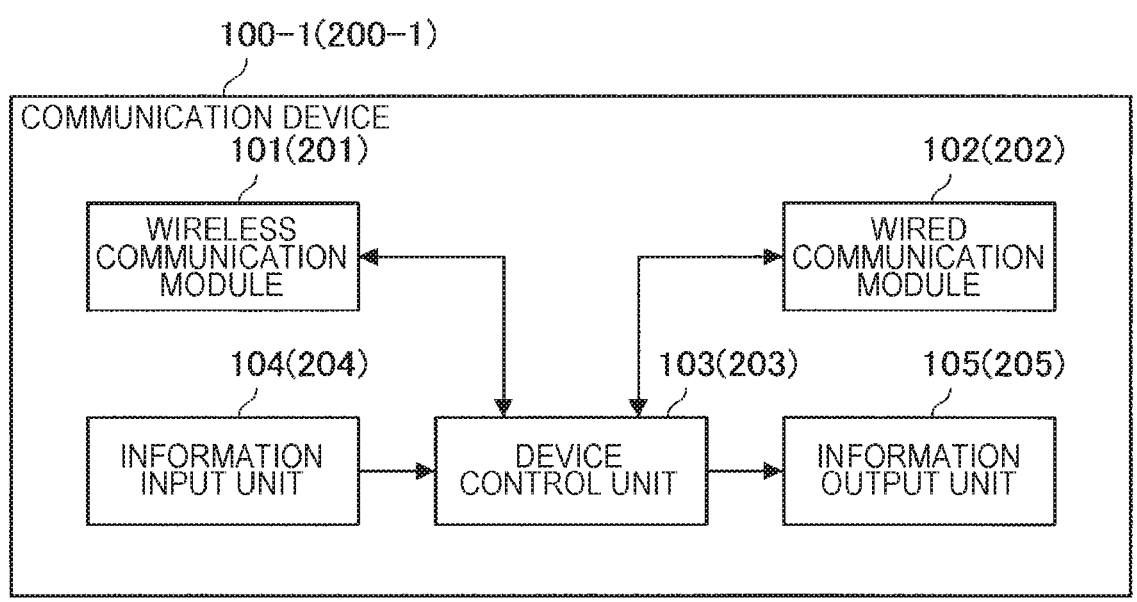
FIG. 2 is a block diagram illustrating an example of a schematic functional configuration of a communication device according to the embodiment.

The configuration of the communication system according to the first embodiment of the present disclosure has been described above. Next, functional configurations of the AP 100-1 and the STA 200-1 (hereinafter also referred to as communication device 100-1 (200-1)) according to the present embodiment will be described with reference to FIG. 2. FIG. 2 is a block diagram illustrating an example of a schematic functional configuration of a communication device 100-1 (200-1) according to the first embodiment of the present disclosure.

As illustrated in FIG. 2, a communication device 100-1 (200-1) includes a wireless communication module 101 (201), a wired communication module 102 (202), a device control unit 103 (203), an information input unit 104 (204), and an information output unit 105 (205).

The wireless communication module 101 (201) performs wireless communication with the AP 100-1 or the STA 200-1. Specifically, the wireless communication module 101 (201) transmits data obtained from the device control unit 103 (203) and provides received data to the device control unit 103 (203). The details will be described later.

The wired communication module 102 (202) communicates with an external device via wired communication. Specifically, the wired communication module 102 (202) is connected to the Internet and communicates with the external device via the Internet. For example, the wired communication module 102 (202) transmits data acquired via communication by the wireless communication module 101 (201) to the external device via the Internet.

The device control unit 103 (203) controls operation of the communication device 100-1 (200-1) in general. Specifically, the device control unit 103 (203) controls communication of the wireless communication module 101 (201) and the wired communication module 102 (202). For example, the device control unit 103 (203) causes the wireless communication module 101 (201) or the wired communication module 102 (202) to transmit data obtained from the information input unit 104 (204). Further, the device control unit 103 (203) causes the information output unit 105 (205) to output data obtained by the communication of the wireless communication module 101 (201) or the wired communication module 102 (202).

The information input unit 104 (204) receives an input from the outside of the communication device 100-1 (200-1). Specifically, the information input unit 104 (204) receives a user input or information obtained from a sensor. For example, the information input unit 104 (204) is an input device such as a keyboard or a touch panel or a detection device such as a sensor.

The information output unit 105 (205) outputs data. Specifically, the information output unit 105 (205) outputs data instructed from the device control unit 103 (203). For example, the information output unit 105 (205) is a display that outputs images on the basis of image information, a speaker that outputs sounds or music on the basis of audio information, or the like.

Further, the wired communication module 102 (202), the information input unit 104 (204) and the information output unit 105 (205) among the above components may not be included in the communication device 100-1 (200-1).

(Configuration of Wireless Communication Module)

Figure 3:
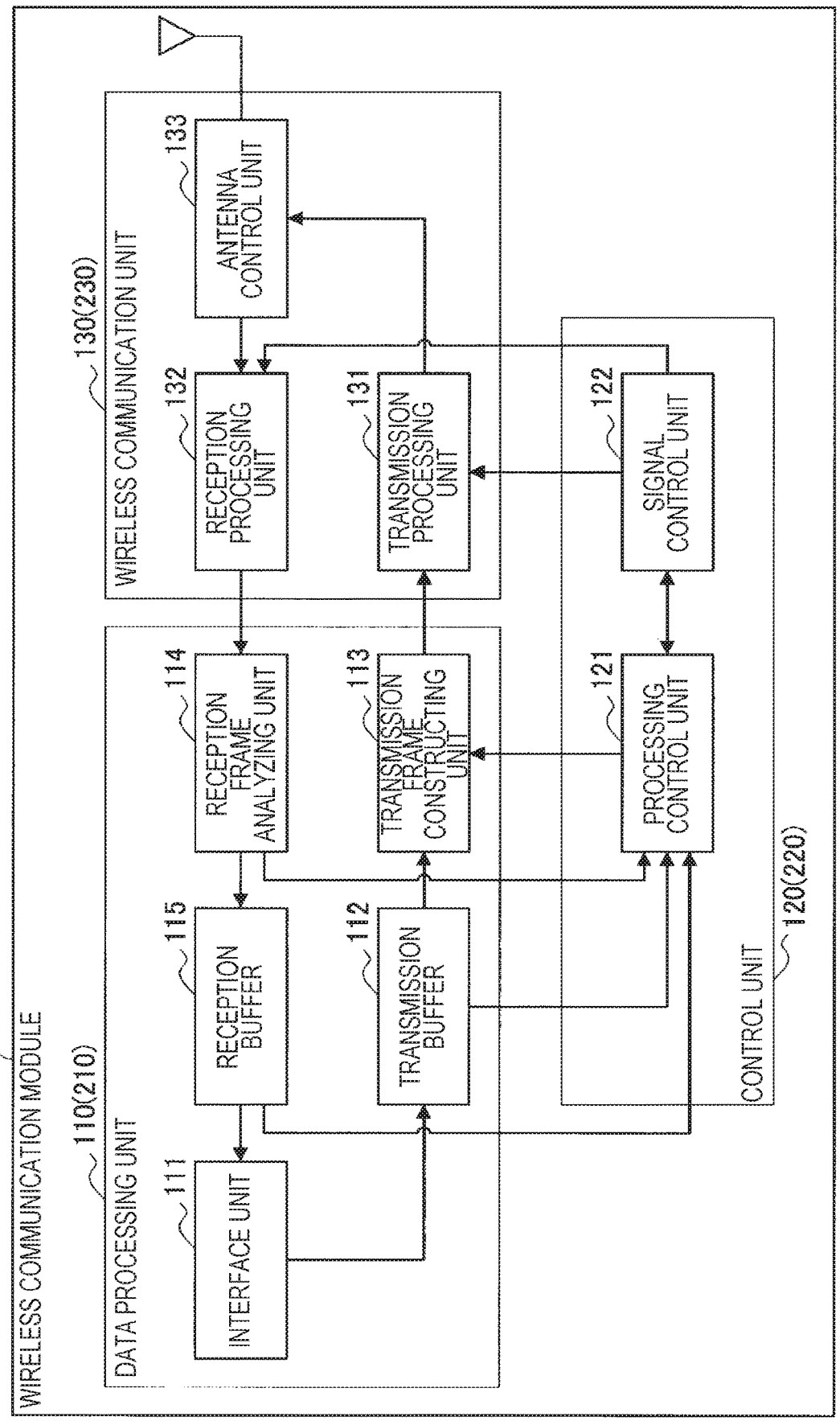
FIG. 3 is a block diagram illustrating an example of a schematic functional configuration of a wireless communication module according to the embodiment.

Next, a functional configuration of the wireless communication module 101 (201) will be described with reference to FIG. 3. FIG. 3 is a block diagram illustrating an example of a schematic functional configuration of the wireless communication module 101 (201) according to the first embodiment of the present disclosure.

As illustrated in FIG. 3, the wireless communication module 101 (201) includes a data processing unit 110 (210), a control unit 120 (220), and a wireless communication unit 130 (230) as a communication unit.

(1. Data Processing Unit)

As illustrated in FIG. 3, the data processing unit 110 (210) includes an interface unit 111, a transmission buffer 112, a transmission frame constructing unit 113, a reception frame analyzing unit 114, and a reception buffer 115.

The interface unit 111 is an interface connected to other functional components installed in the communication device 100-1 (200-1). Specifically, the interface unit 111 performs reception of data that is desired to be transmitted from another functional component, for example, the device control unit 103 (203), provision of reception data to the device control unit 103 (203), and the like.

The transmission buffer 112 stores data to be transmitted. Specifically, the transmission buffer 112 stores data obtained by the interface unit 111.

The transmission frame constructing unit 113 generates a frame to be transmitted. Specifically, the transmission frame constructing unit 113 generates a frame on the basis of data stored in the transmission buffer 112 or control information set by the control unit 120 (220). For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 (230) and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114.

(2. Control Unit)

As illustrated in FIG. 3, the control unit 120 (220) includes a processing control unit 121 and a signal control unit 122.

The processing control unit 121 controls an operation of the data processing unit 110 (210). Specifically, the processing control unit 121 controls the occurrence of communication. For example, if a communication connection request occurs, the processing control unit 121 causes the data processing unit 110 (210) to generate frames related to a connection process or an authentication processing such as an association process or an authentication process.

Further, the processing control unit 121 controls generation of frames on the basis of a storage state of data in the transmission buffer 112, an analysis result for a reception frame, or the like. For example, in a case in which data is stored in the transmission buffer 112, the processing control unit 121 instructs the transmission frame constructing unit 113 to generate a data frame in which the data is stored. Further, in a case in which reception of a frame is confirmed by the reception frame analyzing unit 114, the processing control unit 121 instructs the transmission frame constructing unit 113 to generate an acknowledgment frame which is a response to a received frame.

The signal control unit 122 controls an operation of the wireless communication unit 130 (230). Specifically, the signal control unit 122 controls a transmission/reception process of the wireless communication unit 130 (230). For example, the signal control unit 122 causes the wireless communication unit 130 (230) to set a parameter for transmission and reception on the basis of an instruction from the processing control unit 121.

Further, information related to the wireless communication network such as the PID is managed by the control unit 120 (220). For example, the control unit 120 (220) manages BSS information such as COLOR information of one's own BSS and other BSSs.

(Wireless Communication Unit)

As illustrated in FIG. 3, the wireless communication unit 130 (230) includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 (210) in accordance with a coding and modulation scheme instructed by the control unit 120 (220). Further, the transmission processing unit 131 converts the signal related to the symbol stream obtained by the process at the previous stage into an analog signal, and performs amplification, filtering, and frequency up-conversion on the resulting signal.

Further, the transmission processing unit 131 may perform a frame multiplexing process. Specifically, the transmission processing unit 131 performs a process related to frequency division multiplexing or space division multiplexing.

The reception processing unit 132 performs a frame reception process. Specifically, the reception processing unit 132 restores the frame on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained by the process at the previous stage and provides the acquired frame to the data processing unit 110 (210) or the control unit 120 (220).

Further, the reception processing unit 132 may perform a process related to separation of a multiplexed frame. Specifically, the reception processing unit 132 performs a process related to separation of a frame multiplexed by the frequency division multiplexing or the space division multiplexing.

Further, the reception processing unit 132 may estimate a channel gain. Specifically, the reception processing unit 132 calculates complex channel gain information from a preamble portion or a training signal portion of the signal obtained from the antenna control unit 133. Further, the calculated complex channel gain information is used for a frame multiplexing-related process, a frame separation process, and the like.

The antenna control unit 133 performs transmission and reception of signals via at least one antenna. Specifically, the antenna control unit 133 transmits the signal generated by the transmission processing unit 131 via the antenna and provides the signal received via the antenna to the reception processing unit 132. Further, the antenna control unit 133 may perform control related to space division multiplexing.

Further, the transmission/reception process of the PHY header including the PID or the like is performed by the wireless communication unit 130 (230). The process will be described in detail later. Further, hereinafter, the data processing unit 110 (210), the control unit 120 (220), and the wireless communication unit 130 (230) are also referred to simply as a data processing unit 110, a control unit 120 and a wireless communication unit 130.

1-3. Details of Functions of Device

Next, the details of functions of the communication device 100-1 (200-1) according to the present embodiment will be described. Functions of each of the communication device 100-1 (200-1) operating as a transmission side (also referred to as a "transmitting device") and the communication device 100-1 (200-1) operating as a reception side (hereinafter also referred to as a "receiving device") will be described below.

(A. Functions of Transmitting Device)

First, functions of the transmitting device will be described.

(A-1. Setting of Wild Card PID)

The transmitting device sets a transmission destination of data in a case in which a data transmission request occurs. Specifically, the transmitting device sets a wireless communication network identifier related to a wireless communication network serving as the transmission destination. For example, the transmitting device sets a PID in which the BSS serving as the transmission destination is identified in the physical layer. An example of the PID includes the COLOR information of the BSS.

Here, the transmitting device uses a second level wireless communication network identifier in which a plurality of first level wireless communication network identifiers are specified in a case in which there are a plurality of first level wireless communication networks serving as the transmission destination. Specifically, in a case in which there are a plurality of PIDs serving as the transmission destination, the transmitting device sets a wild card PID in which a plurality of PIDs are specified. The wild card PID is a PID in which all PIDs are specified (hereinafter also referred to as an "unspecified wild card PID"). For example, if the data transmission request occurs, in a case in which the transmission destination of data is an unspecified BSS, the control unit 120 sets a wild card value in which all pieces of COLOR information are specified (hereinafter also referred to as "unspecified wild card COLOR information") as the COLOR information. Further, in a case in which the unspecified wild card PID and a specified wild card PID to be described later are not distinguished, they are referred to simply as a "wild card PID." The same applies to the COLOR information.

Further, a plurality of types of wild card PIDs may be set. Specifically, the wild card PID may be a PID in which some PIDs among all the PIDs are specified (hereinafter also referred to as "specified wild card PID"), and a plurality of unspecified wild card PIDs may be set. Then, the transmitting device selects the unspecified wild card PID on the basis of a purpose of a frame to be transmitted. Examples of the purpose of the frame include transmission of data, transmission of a control command such as an instruction of a communication process, and transmission of a control command such as an instruction of an operation process of a communication process. Further, the unspecified wild card PID is selected on the basis of an attribute of a frame to be transmitted. The examples of the attribute of the frame include a type, content, a transmission target range, a priority, and a security level of the frame. The transmitting device sets the unspecified wild card PID corresponding to the attribute of the frame to be transmitted as the PID to be included in the PHY header. Further, in a case in which the PID is the COLOR information, the specified wild card PID is also referred to as "specified wild card COLOR information."

Further, the unspecified wild card PID may be selected on the basis of an attribute of the transmission destination of the frame to be transmitted. Examples of the attribute of the transmission destination of the frame include a BSS to which the communication device belongs and a type, a position, and a security level of the communication device. The transmitting device sets the unspecified wild card PID corresponding to the attribute of the communication device serving as the transmission destination of the frame to be transmitted as the PID to be included in the PHY header.

For example, in a case in which the attribute of the transmission destination of the frame is the BSS to which the communication device belongs, when there are a plurality of BSSs to which the communication device serving as the transmission destination of the frame belongs, the transmitting device sets a wild card PID in which the plurality of BSSs are specified as the PID of the PHY header. More specifically, when a plurality of communication devices belonging to different BSSs are the transmission destinations of the frame, the control unit 120 selects wild card COLOR information in which all or some pieces of the COLOR information of the BSSs to which the transmission destination belongs are specified and uses the selected wild card COLOR information as the COLOR information to be stored in the PHY header.

(A.2. Setting of Link Direction Identification Information)

The transmitting device sets information for further narrowing down a reception target of the frame to be transmitted. Specifically, the control unit 120 sets the link direction identification information for the frame to be transmitted. More specifically, the link direction identification information includes uplink identification information and downlink identification information. For example, the link direction identification information is a set of an uplink indicator and a downlink indicator.

More specifically, in a case in which the frame to be transmitted is an uplink frame, that is, a frame addressed to the AP, the control unit 120 sets the uplink indicator to 1 and sets the downlink indicator to 0. Further, in a case in which the frame to be transmitted is a frame for downlink frame, that is, for STA, the control unit 120 sets the downlink indicator to 1 and sets the uplink indicator to 0. Further, the presence or absence of each indicator may be set instead of setting the value of each indicator. Further, in the above example, the link direction identification information is a set of the uplink indicator and the downlink indicator, but the link direction identification information may be only one of the uplink indicator and the downlink indicator.

(A-3. Transmission of PHY Header)

Figure 4:
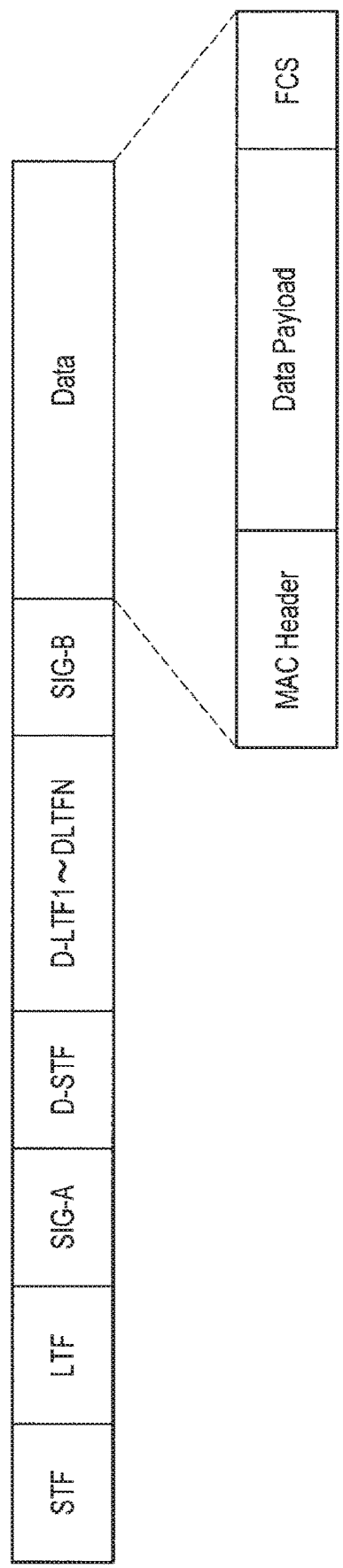
FIG. 4 is a diagram illustrating a configuration example of a frame transmitted by a transmitting device according to the embodiment.

The transmitting device sends a frame with the PHY header including the PID. Specifically, the control unit 120 causes the data processing unit 110 to generate the frame on the basis of the data transmission request. Further, the control unit 120 causes the wireless communication unit 130 to generate the PHY header of the frame. Then, if the generated frame is provided from the data processing unit 110, the wireless communication unit 130 transmits the generated PHY header and transmits the frame subsequently to the PHY header. Further, the PHY header includes a PLCP header and is processed in the PHY layer.

the set PID and the link direction identification information are stored in the PHY header. Specifically, the PHY header stores the uplink indicator, the downlink indicator, and either of the normal PID and a wild card PID. Further, a configuration of the frame transmitted by the transmitting device will be described with reference to FIG. 4. FIG. 4 is a diagram illustrating a configuration example of the frame transmitted by the transmitting device according to the present embodiment.

As illustrated in FIG. 4, the frame transmitted by the transmitting device includes fields such as a short training field (STF), a long training field (LTF), signal (SIG)-A, D-STF, D-LTF 1 to DLTFN, SIG-B, and Data. Further, the Data field also includes fields such as a MAC Header, a Data Payload, and a frame check sequence (FCS). Further, the MAC Header field includes fields such as Frame Type, Duration, Address 1 to Address 3, Sequence Control, Address 4, QoSControl, and HT Control. Further, the SIG-A field will be described in detail with reference to FIGS. 5 and 6. FIGS. 5 and 6 are diagrams illustrating a configuration example of the signaling information in the PHY header of the frame transmitted by the transmitting device according to the present embodiment.

FIG. 5 illustrates a configuration example of the SIG-A field in a case in which the frame type is a control frame. As illustrated in FIG. 5, the SIG-A field includes fields such as Downlink (DL) Indication storing the downlink indicator, Space Time Block Coding (STBC), Uplink (UL) Indication storing the uplink indicator, Bandwidth (BW), Nsts, PID, PARTIAL Association ID (AID), Short GI (SGI), Coding, Modulation and Coding Set (MCS), Smoothing, Aggregation, Length, Response Indication, Doppler, NDP Indication, Cyclic Redundancy Check (CRC), and Tail. Further, as the PID field, there is a COLOR field of the BSS.

FIG. 6 illustrates a configuration example of the SIG-A field in a case in which the frame type is a data frame. As illustrated in FIG. 6, the SIG-A field includes fields such as Multi User (MU)/Single User (SU), STBC, UL Indication storing the uplink indicator, BW, Nsts, PID, PARTIAL AID, SGI, Coding, MCS, Beam Channel/Smoothing, Aggregation, Length, Response Indication, DL Indication storing the downlink indicator, Doppler, CRC, and Tail.

Further, the frame serving as the portion following to the PHY header may be an aggregation frame. Specifically, the transmitting device connects data addressed to the device belonging to the network related to the normal PID specified from the wild card PID, and transmits the concatenated data as the portion following to the PHY header. For example, in a case in which there are a plurality of pieces of data addressed to the communication device belonging to the BSS related to the COLOR information specified from the set wild card COLOR information (hereinafter also referred to as "normal COLOR information"), the control unit 120 causes the data processing unit 110 to generate a data payload related to the plurality of pieces of data and connect the generated data payload. Then, the wireless communication unit 130 transmits the frame including the connected data payload subsequently to the PHY header. Further, a unit of data to be connected may be a MAC service data unit (MSDU), a MAC protocol data unit (MPDU), or any other data unit.

(B. Functions of Receiving Device)

Next, functions of the receiving device will be described.

(B-1. Reception of PHY Header)

The receiving device receives the PHY header including the PID. Specifically, if the PHY header is received, the wireless communication unit 130 acquires the PID and the link direction identification information included in the PHY header. The acquired PID and the link direction identification information are provided to the control unit 120.

(B-2. Determination of Subsequent Process)

The receiving device receives the portion subsequent to the PHY header on the basis of the PID included in the PHY header. More specifically, in a case in which the PID included in the received PHY header is the normal PID, the receiving device receives the portion subsequent to the PHY header in accordance with whether or not the receiving device belongs to a BSS related to the PID. Further, in a case in which the PID included in the received PHY header is the wild card PID, the receiving device receives the portion following to the PHY header in accordance with whether or not the receiving device belongs to a BSS related to the normal PID specified from the wild card PID (hereinafter also referred to as a "target BSS"). For example, in a case in which the COLOR information provided from the wireless communication unit 130 is the specified wild card COLOR information, when the COLOR information of one's own BSS is specified from the specified wild card COLOR information, one's own BSS becomes the reception target of the frame. Further, in a case in which the provided COLOR information is the unspecified wild card COLOR information, since all the BSSs are specified, one's own BSS becomes the reception target of the frame. Therefore, in a case in which a link direction of the frame including the PHY header is addressed to the receiving device, the control unit 120 determines that the portion subsequent to the PHY header is received in the frame.

Further, the receiving device receives the portion following to the PHY header in accordance with the link direction identification information in addition to the PID. Specifically, in a case in which the receiving device belongs to the target BSS, the receiving device receives the portion subsequent to the PHY header in accordance with the link direction identification information of the PHY header. For example, in a case in which the link direction identification information provided from the wireless communication unit 130 indicates uplink (that is, the uplink indicator is 1 and the downlink indicator is 0), and the receiving device is the AP, when one's own BSS is the target BSS, the control unit 120 determines that the portion subsequent to the PHY header is received in the frame related to the PHY header. Further, in a case in which the link direction identification information indicates downlink (that is, the downlink indicator is 1, and the uplink indicator is 0), and the receiving device is the STA, when one's own BSS is the target BSS, the control unit 120 determines that the portion subsequent to the PHY header is received.

(B-3. Execution of Subsequent Process)

The receiving device executes the subsequent process in accordance with whether or not the portion subsequent to the PHY header is received. Specifically, in a case in which the portion subsequent to the PHY header is determined to be received, the receiving device executes a reception process for the portion subsequent to the PHY header. For example, the control unit 120 causes the wireless communication unit 130 and the data processing unit 110 to receive the portion subsequent to the PHY header, for example, the MPDU, on the basis of information included in a subsequent MAC header included in the PHY header.

Further, in a case in which the portion subsequent to the PHY header is determined not to be received, the receiving device stops the reception process. For example, the control unit 120 causes the wireless communication unit 130 not to decode the portion subsequent to the PHY header.

Further, the receiving device controls whether or not the sleep mode is executed in accordance with whether or not the portion subsequent to the PHY header is received. Specifically, the receiving device controls whether or not a communication process in a transmission period of the portion subsequent to the PHY header is paused in accordance with whether or not the portion subsequent to the PHY header is received. For example, in a case in which the portion subsequent to the PHY header is determined not to be received, the control unit 120 causes a communication function to be stopped until the reception of the portion subsequent to the PHY header in the wireless communication unit 130 ends. Further, only one of the transmission function and the reception function may be stopped.

Further, in a case in which the receiving device does not enter the sleep mode, it is controlled whether or not a transmission process in a reception period of the portion subsequent to the PHY header is stopped on the basis of reception signal strength of the PHY header. Specifically, the receiving device controls a setting of a transmission stop period of the receiving device for the transmission period of the portion subsequent to the PHY header on the basis of the reception signal strength of the PHY header in accordance with whether or not the portion subsequent to the PHY header is received. For example, in a case in which the portion subsequent to the PHY header is determined not to be received, and the reception signal strength (or received field strength) of the frame is larger than or equal to a threshold value, when the receiving device is unable to enter the sleep mode because the receiving device is not a device which does not support the sleep mode or for any reason, the control unit 120 set the transmission stop period such as a network allocation vector (NAV) for the reception period of the portion subsequent to the PHY header. In this case, it is possible to suppress interference of communication in the reception period of the portion subsequent to the PHY header.

Further, in a case in which the portion subsequent to the PHY header is determined not to be received, and the reception signal strength of the frame is less than the threshold value, the control unit 120 do not set the transmission stop period. Therefore, in a case in which the data transmission request occurs in the receiving device, the frame is transmitted even in the transmission period of the subsequent portion to the PHY header. In this case, the use efficiency of wireless communication resources can be improved.

Further, the receiving device may control whether the sleep mode is executed on the basis of the reception signal strength of the PHY header. For example, in a case in which the portion subsequent to the PHY header is determined not to be received, and the reception signal strength of the frame is larger than or equal to the threshold value, the control unit 120 causes the wireless communication unit 130 to pause the communication process.

1-4. Process of Device

Next, a process of the communication device 100-1 (200-1) according to the present embodiment will be described.

(Process of Transmitting Device)

Figure 7:
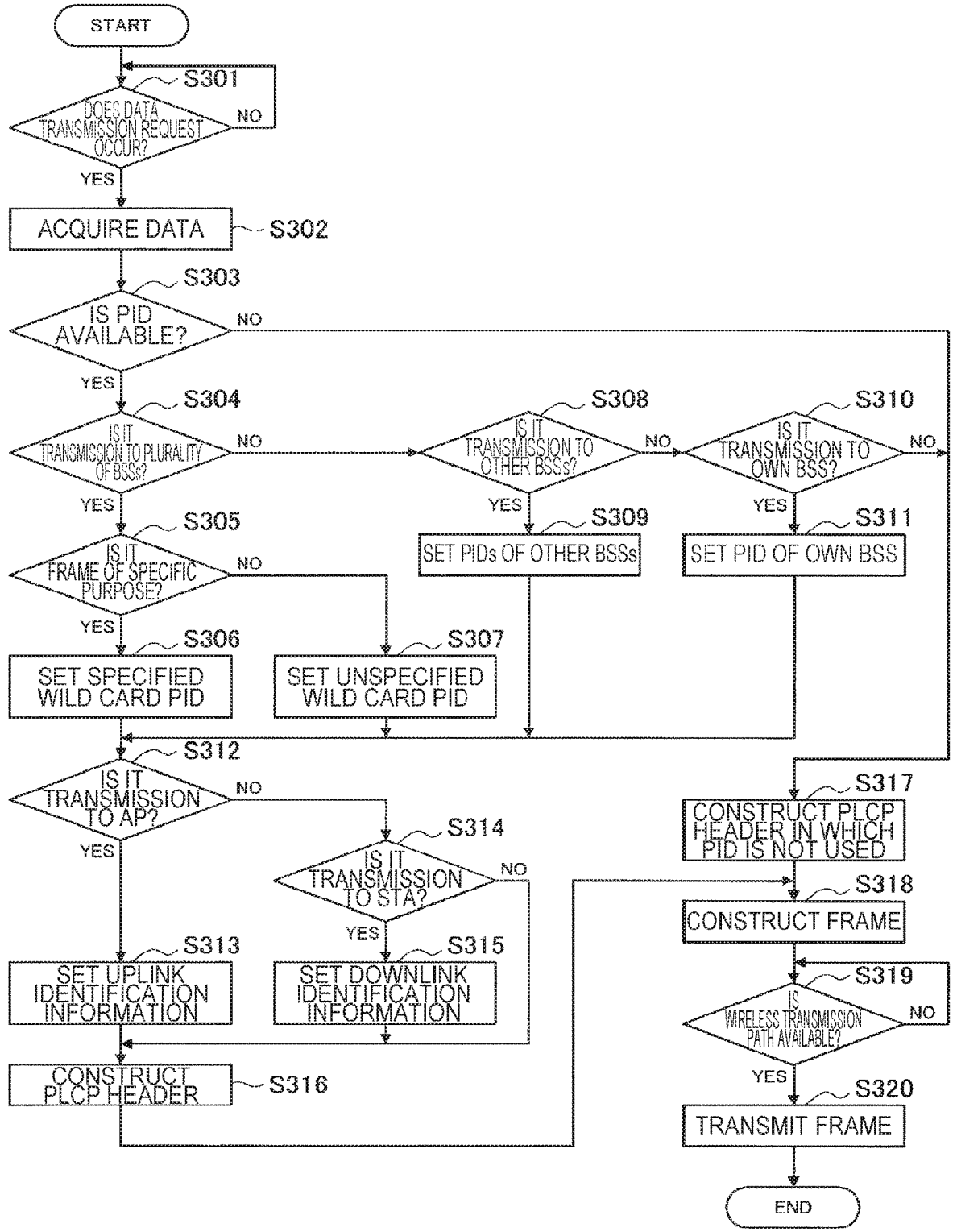
FIG. 7 is a flowchart conceptually illustrating a process of a transmitting device according to the embodiment.

First, a process of the communication device 100-1 (200-1) operating as the transmitting device will be described with reference to FIG. 7. FIG. 7 is a flowchart conceptually illustrating a process of the transmitting device according to the present embodiment.

If a data transmission request occurs (step S301), the transmitting device acquires data related to the data transmission request (step S302). Specifically, if data desired to be transmitted is provided, the data processing unit 110 stores the provided data in the transmission buffer 112.

Then, the transmitting device determines whether or not the PID is available (step S303). Specifically, the control unit 120 determines whether or not the COLOR information is included in the PLCP header.

If the PID is determined to be available, the transmitting device determines whether it is transmission to a plurality of BSSs (step S304). Specifically, in a case in which the COLOR information is determined to be included in the PLCP header, the control unit 120 determines whether or not there are a plurality of BSSs serving as the transmission destination of the frame.

If it is determined that it is not transmission to a plurality of BSSs, the transmitting device determines whether or not it is a frame of a specific purpose (step S305). Specifically, in a case in which the transmission destination of the frame is determined not to be a plurality of BSSs, the control unit 120 determines whether or not it is a frame of a specific purpose on the basis of the attribute of the frame or the attribute of the transmission destination of the frame.

If it is determined to be a frame of a specific purpose, the transmitting device sets the specified wild card PID (step S306). Specifically, in a case in which it is determined that it is a frame of a specific purpose, the control unit 120 sets the specified wild card COLOR information on the basis of the attribute of frame or the attribute of the transmission destination of frame.

If it is determined in step S305 that it is not a frame of a specific purpose, the transmitting device sets the unspecified wild card PID (step S307). Specifically, if it is determined that it is not a frame of a specific purpose, the control unit 120 sets the unspecified wild card COLOR information.

If it is determined in step S304 that it is transmission to a specific BSS, the transmitting device determines whether or not it is transmission to other BSSs (step S308). Specifically, the control unit 120 determines whether or not the transmission destination of frame is all other BSS or communication devices belonging to other BSSs.

If it is determined that it is transmission to other BSSs, the transmitting device sets the PIDs of other BSSs (step S309). Specifically, if it is determined that the transmission destination of the frame is other BSSs, the control unit 120 sets the COLOR information of other BSSs.

If it is determined that it is not transmission to other BSSs, the transmitting device determines whether or not it is transmission to one's own BSS (step S310). Specifically, in a case in which it is determined that the transmission destination of the frame is not other BSSs, the control unit 120 determines whether or not the transmission destination of the frame is all of one's own BSSs or communication devices belonging to one's own BSSs.

If it is determined that it is transmission to one's own BSS, the transmitting device sets the PID of one's own BSS (step S311). Specifically, if it is determined that the transmission destination of the frame is one's own BSS, the control unit 120 sets the COLOR information of one's own BSS.

Then, the transmitting device determines whether or not it is transmission to the AP (step S312). Specifically, the control unit 120 determines whether or not the transmission destination is a communication device operating as the AP.

If it is determined that it is transmission to the AP, the transmitting device sets the uplink identification information (step S313). Specifically, if it is determined that it is transmission to the AP, the control unit 120 sets the uplink indicator to 1. Further, the downlink indicator may be set to 0.

If it is determined in step S312 that it is not transmission to the AP, the transmitting device determines whether or not it is transmission to the STA (step S314). Specifically, if the transmission destination is determined not to be the AP, the control unit 120 determines whether or not the transmission destination is a communication device operating as the STA.

If it is determined that it is transmission to the STA, the transmitting device sets the downlink identification information (step S315). Specifically, if the transmission destination is determined to be the STA, the control unit 120 sets the downlink indicator to 1. Further, the uplink indicator may be set to 0.

Then, the transmitting device constructs the PLCP header (step S316). Specifically, the control unit 120 causes the wireless communication unit 130 to construct the PLCP header including the set COLOR information, the uplink indicator, and the downlink indicator.

Further, if it is determined in step S303 that the PID is not available, the transmitting device constructs the PLCP header that does not use the PID (step S317). Specifically, the control unit 120 causes the wireless communication unit 130 to construct a PLCP header of a format including no COLOR information.

Then, the transmitting device constructs a frame (step S318). Specifically, the control unit 120 causes the data processing unit 110 to construct a frame including the data stored in the transmission buffer 112 as the data payload. The constructed frame is provided to the wireless communication unit 130.

Then, the transmitting device determines whether or not a wireless transmission path is available (step S319). Specifically, the wireless communication unit 130 determines whether or not the wireless transmission path is free using carrier sense or the like.

If the wireless transmission path is determined to be available, the transmitting device transmits the frame (step S320). Specifically, if the wireless transmission path is determined to be free, the wireless communication unit 130 transmits the constructed PLCP header and the provided frame continuously.

(Process of Receiving Device)

Figure 8:
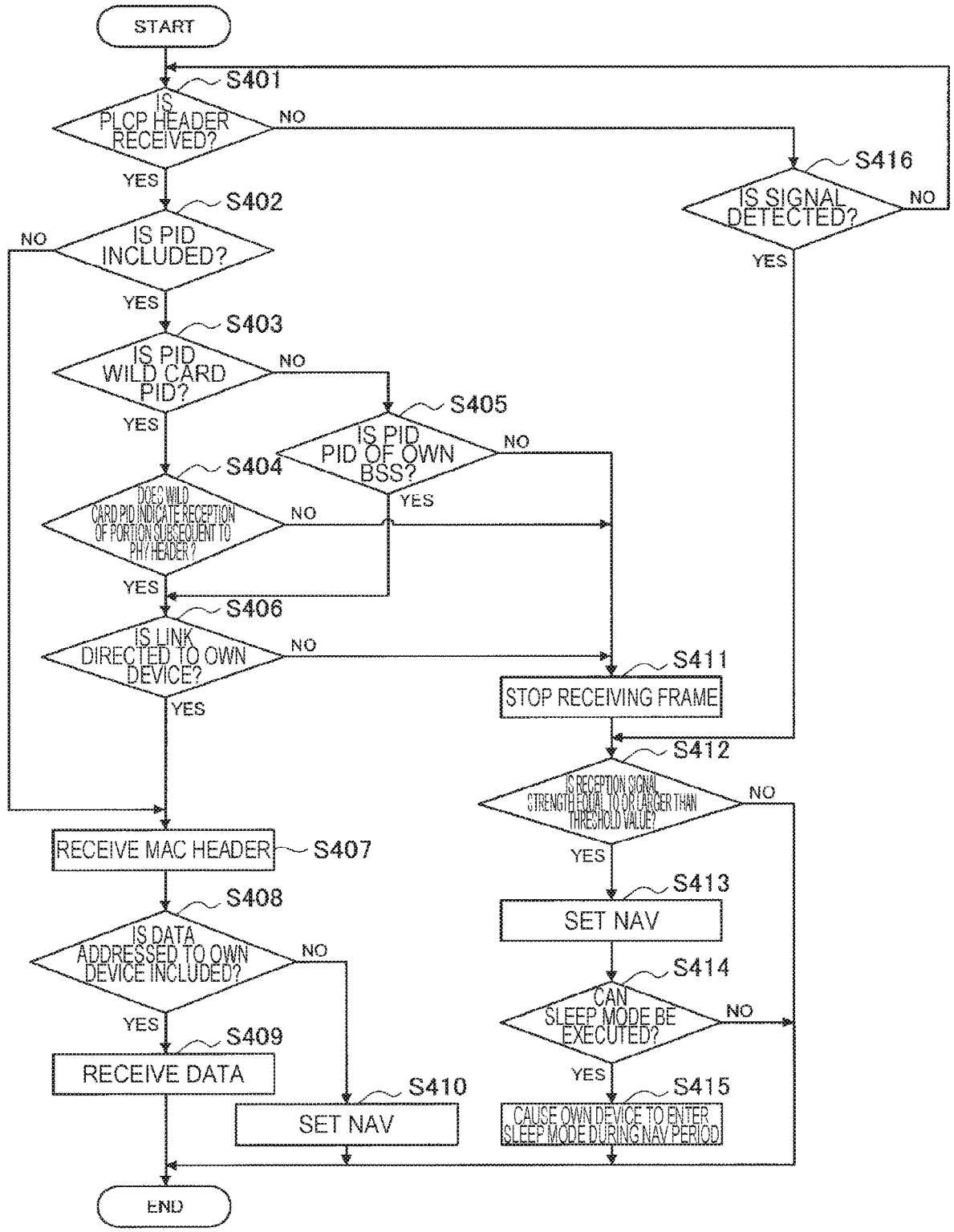
FIG. 8 is a flowchart conceptually illustrating a process of a receiving device according to the embodiment.

Next, a process of the communication device 100-1 (200-1) operating as the receiving device will be described with reference to FIG. 8. FIG. 8 is a flowchart conceptually illustrating a process of the receiving device according to the present embodiment.

If the PLCP header is received (step S401), the receiving device determines whether or not the PID is included in the PLCP header (step S402). Specifically, if the PLCP header is received, the wireless communication unit 130 determines whether or not the COLOR information is included in the PLCP header.

If the PID is determined to be included in the PLCP header, the receiving device determines whether or not the PID is the wild card PID (step S403). Specifically, if the COLOR information is determined to be included in the PLCP header, the wireless communication unit 130 provides the COLOR information to the control unit 120, and the control unit 120 determines whether or not the provided COLOR information is the wild card COLOR information.

In a case in which the PID is determined to be the wild card PID, the receiving device determines whether or not the wild card PID indicates reception of the portion subsequent to the PHY header (step S404). Specifically, if the COLOR information is determined to be the wild card COLOR information, the control unit 120 determines whether or not the wild card COLOR information is wild card COLOR information serving as the second level COLOR information indicating that the receiving device should receive the portion subsequent to the PHY header.

Further, if it is determined in step S403 that the PID is not the wild card PID, the receiving device determines whether or not the PID is the PID of one's own BSS (step S405). Specifically, the control unit 120 determines whether or not the COLOR information which is not the wild card COLOR information is the normal COLOR information of one's own BSS serving as the first level COLOR information.

If it is determined in step S404 that the wild card PID indicates the reception of the portion subsequent to the PHY header, or if it is determined in step S405 that the PID is the PID of one's own BSS, the receiving device determines that the link direction is directed to the receiving device (step S406). Specifically, in a case in which the receiving device is the AP, the control unit 120 determines whether or not the link direction identification information indicates uplink, that is, whether or not the uplink indicator is 1, and the downlink indicator is 0. Further, in a case in which the receiving device is the STA, the control unit 120 determines whether or not the link direction identification information indicates downlink, that is, whether or not the uplink indicator is 0, and the downlink indicator is 1.

In a case in which the link direction is determined directed to the receiving device, the receiving device receives the MAC header (step S407). Specifically, when the link direction identification information indicates the uplink in a case in which the receiving device is the AP, or when the link direction identification information indicates the downlink in a case in which the receiving device is the STA, the control unit 120 causes the wireless communication unit 130 and the data processing unit 110 to receive the MAC header which is the portion subsequent to the PLCP header. Further, even in a case in which it is determined in step S402 that the PID is not included in the PLCP header, the process proceeds to this step.

Then, the receiving device determines whether or not data addressed to the receiving device is included in the frame (step S408). Specifically, the control unit 120 determines whether or not the receiving device is included in destination information of the frame, for example, address information included in the received MAC header.

If data addressed to the receiving device is determined to be included, the receiving device receives the data (step S409). Specifically, if the receiving device is determined to be included in the destination indicated by the MAC header, the control unit 120 causes the wireless communication unit 130 and the data processing unit 110 to receive data subsequent to the MAC header.

In a case in which the data addressed to the receiving device is determined not to be included, the receiving device sets the NAV (step S410). Specifically, if the receiving device is determined not to be included in the destination indicated by the MAC header, the control unit 120 sets the NAV for the period stored in the Duration field of the MAC header.

Further, if it is determined in step S405 that the PID is not the PID of one's own BSS, or if it is determined in step S406 that the link direction is not directed to the receiving device, the receiving device stops receiving the frame (step S411). Specifically, the control unit 120 causes the wireless communication unit 130 to stop the frame reception process.

Then, the receiving device determines whether or not the reception signal strength is equal to or larger than a threshold value (step S412). Specifically, the wireless communication unit 130 determines whether or not the reception signal strength of the PLCP header is equal to or larger than a threshold value. Further, the determination target may be the reception signal strength of the MAC header.

If the reception signal strength is determined to be equal to or larger than the threshold value, the receiving device sets the NAV (step S413). Specifically, if the reception signal strength is determined to be equal to or larger than the threshold value, the control unit 120 sets the NAV for a period until the transmission of the frame ends or a period stored in the Duration field of the MAC header. As described above, it may be controlled whether or not the NAV is set regardless of whether or not the sleep mode is controlled. Further, if the reception signal strength is less than the threshold value, the NAV is not set, and a process for transmission such as subtraction of a backoff counter is continued.

Then, the receiving device determines whether or not the sleep mode can be executed (step S414). Specifically, the control unit 120 determines whether or not the communication function can enter the sleep mode. Further, the functions of the receiving device may be caused to enter the sleep mode.

If the sleep mode can be executed, the receiving device causes the receiving device to enter the sleep mode during the NAV period (step S415). Specifically, if it is determined that the sleep mode can be executed, the control unit 120 causes the wireless communication unit 130 and the data processing unit 110 to pause the communication process of the receiving device during the set NAV period.

Further, if it is determined in step S401 that the PLCP header is not received, the receiving device determines whether or not a signal that is not a PLCP header is detected (step S416). Specifically, the wireless communication unit 130 determines whether or not a signal other than the PLCP header is detected. Further, if a signal other than the PLCP header is determined to be detected, the process proceeds to step S412, and if no signal is determined to be detected, the process returns to step S401.

1-5. Operation Example

Figure 9:
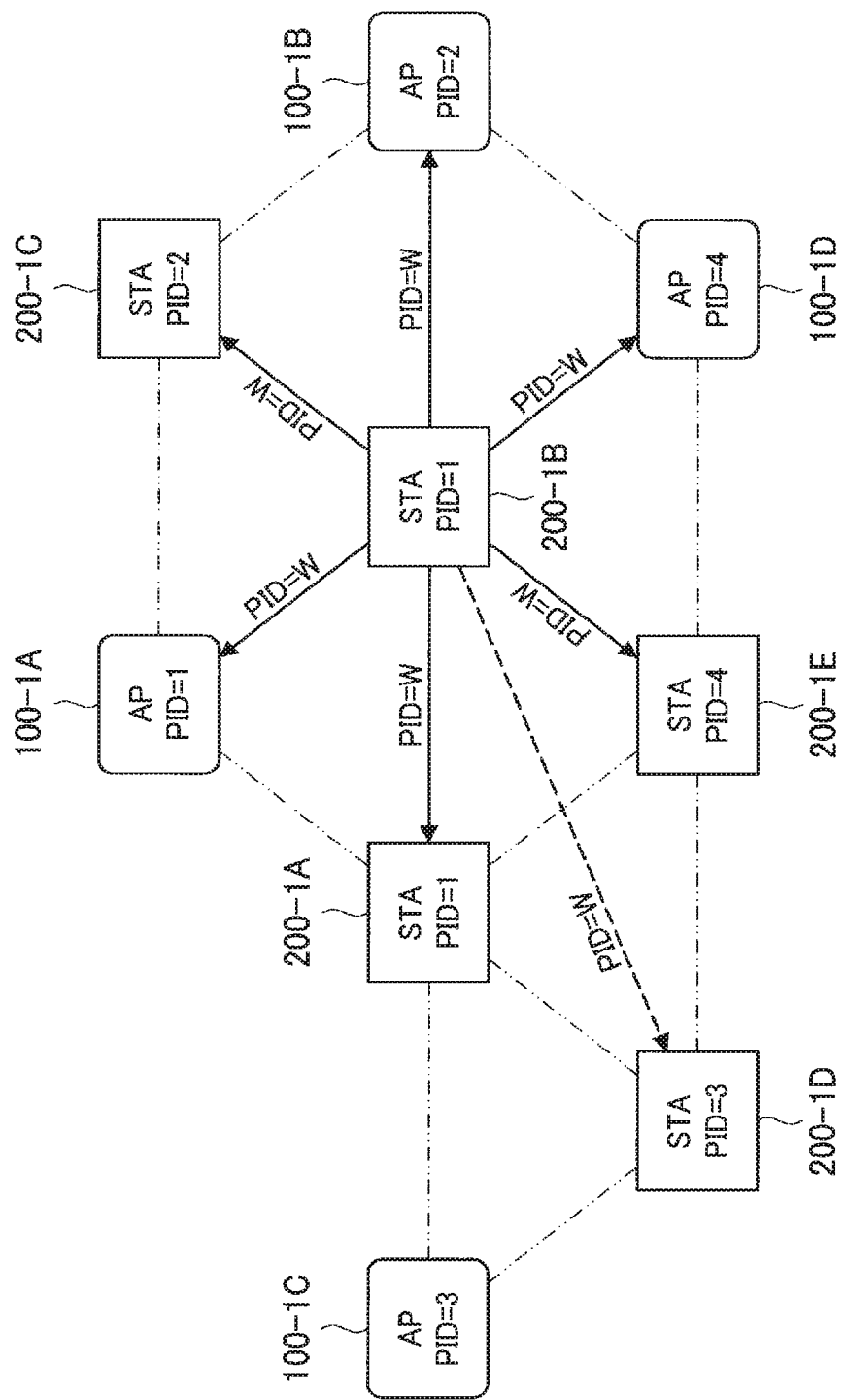
FIG. 9 is a schematic diagram for describing an example of communication using an unspecified wild card PID in a communication system according to the embodiment.
Figure 10:
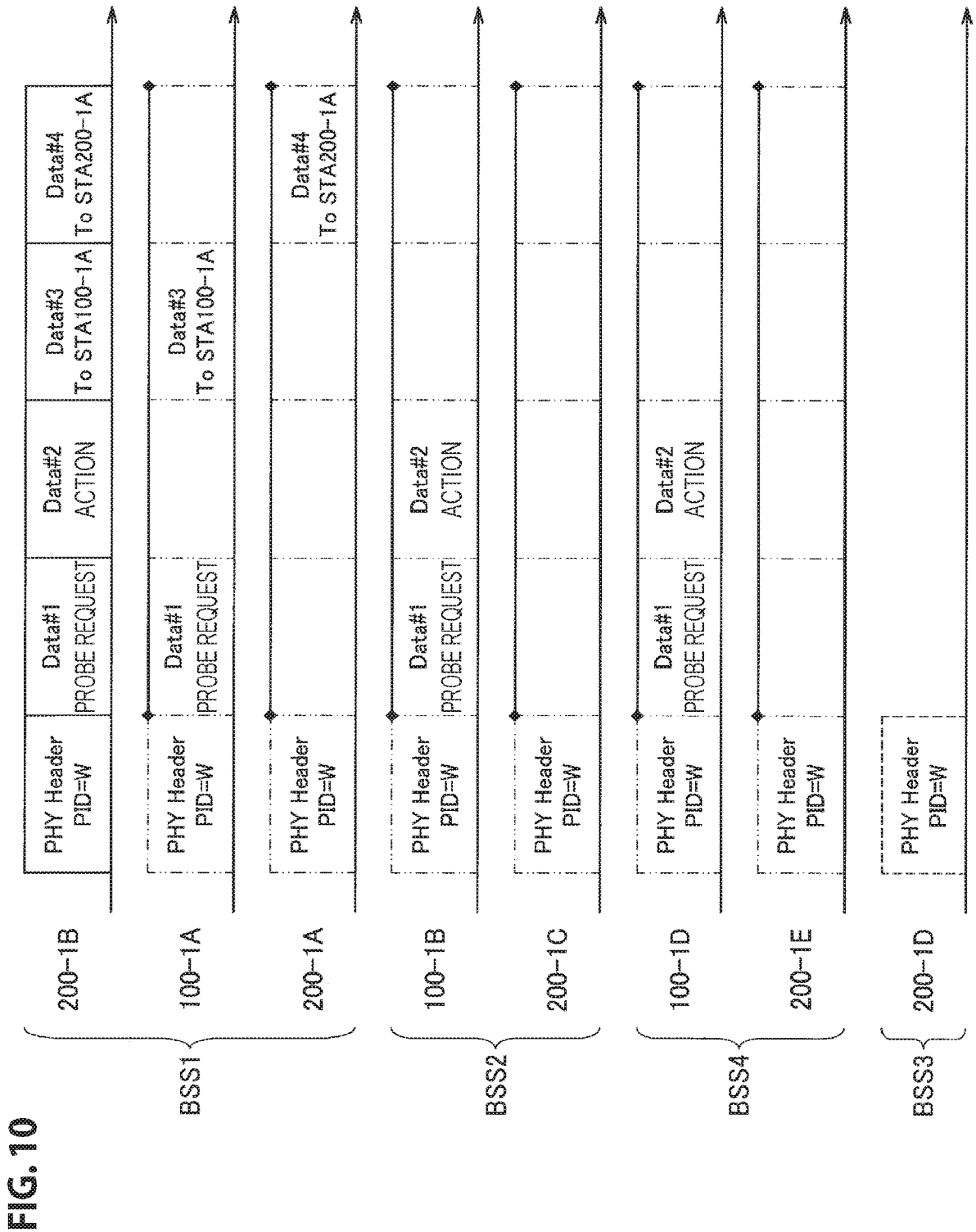
FIG. 10 is a frame sequence diagram for describing an example of communication using an unspecified wild card PID in a communication system according to the embodiment.

The functions and the processes of the communication device 100-1 (200-1) according to the present embodiment have been described above. Then, an example of communication using the unspecified wild card PID will be described with reference to FIGS. 9 and 10. FIG. 9 is a schematic diagram for describing an example of communication using the unspecified wild card PID in the communication system according to the present embodiment, and FIG. 10 is a frame sequence diagram for describing an example of communication using the unspecified wild card PID in the communication system according to the present embodiment.

For example, a case in which an STA 200-1B illustrated in FIG. 9 performs communication using the unspecified wild card PID as the transmitting device is considered.

First, the transmitting device transmits a frame having a PHY header including the unspecified wild card PID as the PID. For example, as illustrated in FIG. 9, the STA 200-1B transmits a PHY header (PID) including a value of W indicating the unspecified wild card PID as a value of the PID to APs 100-1A, 100-1B, and 100-1D and STAs 200-1A and 200-1C to 200-1E.

The receiving device that has received the PHY header determines whether or not the receiving device is the reception target on the basis of the unspecified wild card PID included in the PHY header. For example, each receiving device that has received the PHY header from the STA 200-1B determines that the receiving device is the reception target since the PID included in the PHY header is the unspecified wild card PID.

Then, the receiving device receives the portion subsequent to the PHY header in accordance with the reception signal strength. For example, since the reception signal strength of the PHY header is less than a threshold value, the STA 200-ID does not receive the portion subsequent to the PHY header as illustrated in FIG. 10. Other receiving devices receive the portion subsequent to the PHY header and acquires the data addressed to their own devices. For example, as illustrated in FIG. 10, a frame in which a plurality of pieces of data, a probe request, action information, data addressed to the AP, data addressed to the STA, and the like are connected is received, the AP 100-1A transmits the probe request addressed to the AP 100-1A and data addressed to the AP. Further, the STA 200-1A acquires only the data addressed to the STA from the received frame.

Further, in a case in which the portion subsequent to the PHY header is received, the receiving device sets the reception period of the frame as the transmission stop period. For example, a period from a time after completion of reception of the PHY header indicated by a straight line having a diamond as an end point as illustrated in FIG. 10 to a time after completion of reception of the portion subsequent to the PHY header is set as the NAV period. Further, in a case in which the receiving signal strength of the PHY header is less than the threshold value, and so the portion subsequent to the PHY header is not received, the receiving device may not set the NAV period, and when the data transmission request occurs during the transmission period of the frame, the frame related to the data transmission request may be transmitted.

Figure 11:
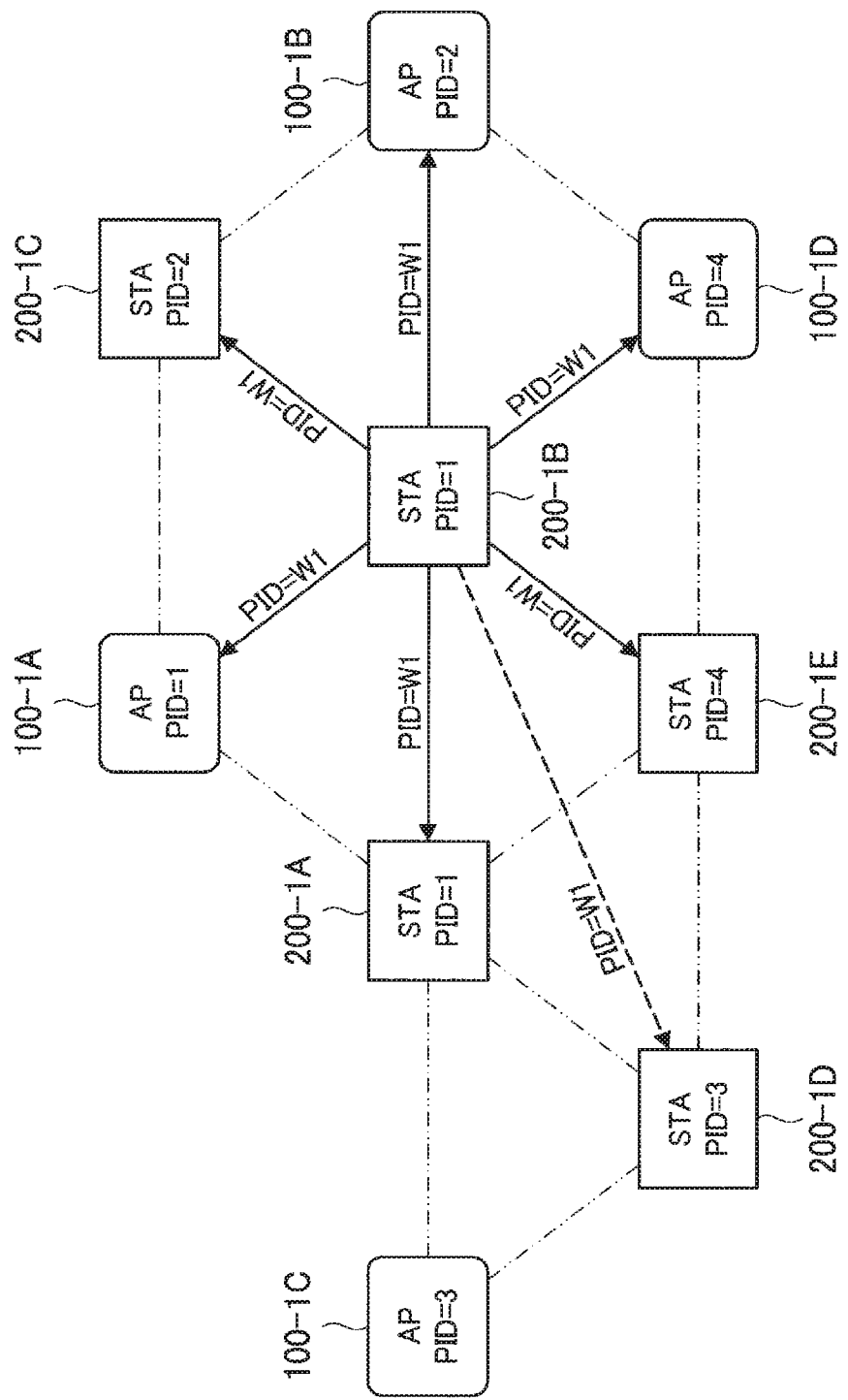
FIG. 11 is a schematic diagram for describing an example of communication using a specified wild card PID in a communication system according to the embodiment.
Figure 12:
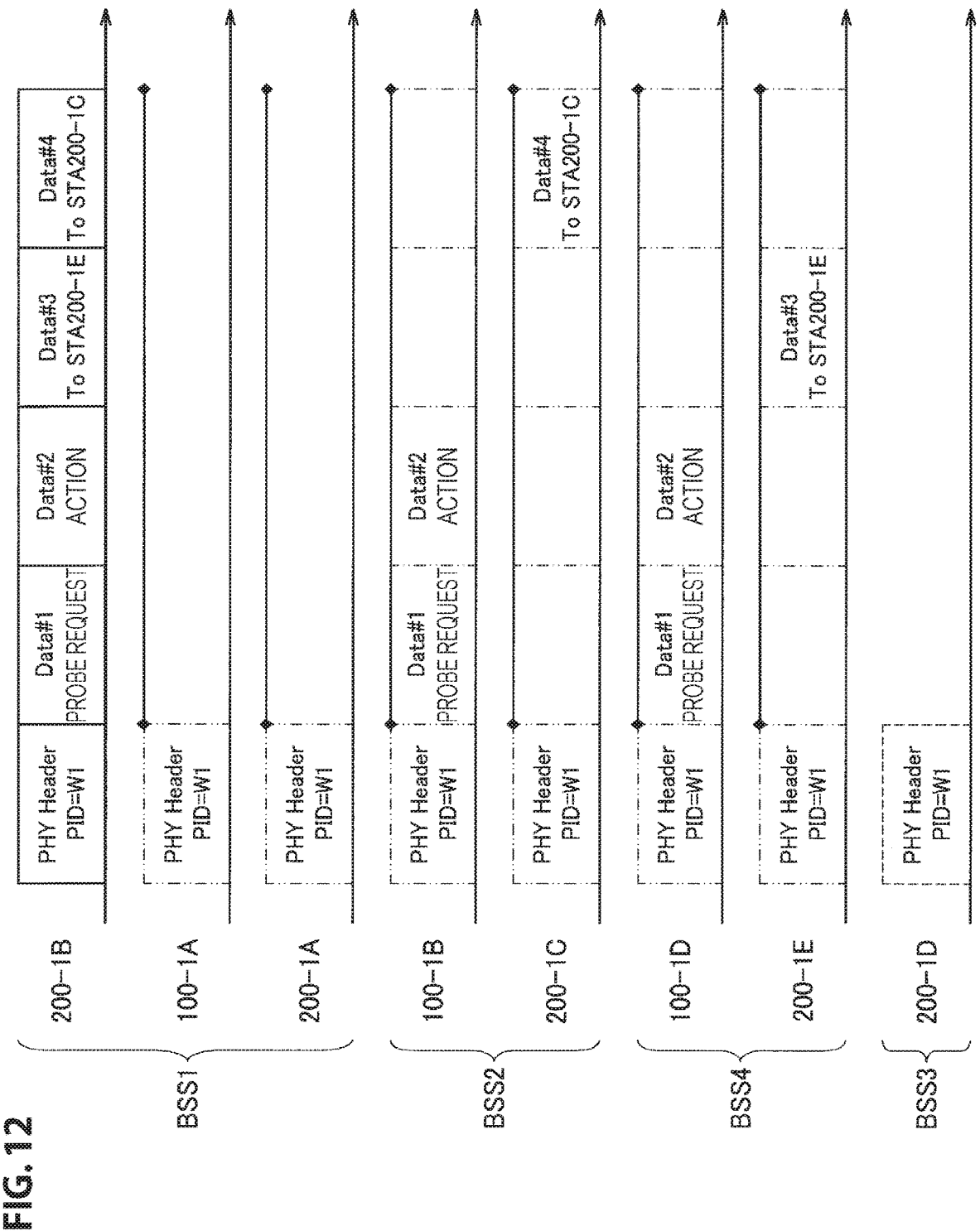
FIG. 12 is a frame sequence diagram for describing an example of communication using a specified wild card PID in a communication system according to the embodiment.

Then, an example of communication with some BSSs using the specified wild card PID will be described with reference to FIG. 11 and FIG. 12. FIG. 11 is a schematic diagram for describing an example of communication using the specified wild card PID in the communication system according to the present embodiment, and FIG. 12 is a frame sequence diagram for describing an example of communication using the specified wild card PID in the communication system according to the present embodiment.

For example, a case in which an STA 200-1B as illustrated in FIG. 11 performs communication using the specified wild card PID as the transmitting device is considered.

First, the transmitting device transmits a PHY header including the specified wild card PID as the PID. For example, as illustrated in FIG. 11, the STA 200-1B transmits a frame including a PHY header (PID) including a value of W 1 indicating the specified wild card PID as a value of the PID to APs 100-1A, 100-1B, and 100-1D and STAs 200-1A and 200-1C to 200-1E. Further, the specified wild card PID is selected on the basis of the attribute of the frame to be transmitted.

The receiving device that has received the PHY header determines whether or not the receiving device is the reception target on the basis of the specified wild card PID included in the PHY header. For example, each receiving device that has received the PHY header from the STA 200-1B determines that the specified wild card PID included in the PHY header is the second level specified wild card PID indicating that each receiving device should receive the portion subsequent to the PHY header.

Then, the receiving device receives the portion subsequent to the PHY header in accordance with the reception signal strength. For example, in a case in which the specified wild card PID indicates that the communication devices belonging to the BSS2 whose PID is 2 and the BSS4 whose PID is 4 should receive the portion subsequent to the PHY header, the AP 100-1 and the STA 200-1 belonging to the BSS2 whose PID is 2 and the BSS4 whose PID is 4 receive the entire frame as illustrated in FIG. 12. Further, the other receiving devices in which the reception signal strength of the PHY header is equal to or larger than a threshold value, for example, 100-1A, stop receiving the portion subsequent to the PHY header and sets the NAV. The STA 200-1D in which the reception signal strength is less than the threshold value stops receiving the portion subsequent to the PHY header but does not set the NAV Further, the receiving device that sets the NAV may cause the communication function to enter the sleep mode for a period corresponding to the NAV period.

1-6. Conclusion of First Embodiment

As described above, according to the first embodiment of the present disclosure, the transmitting device transmits the frame including the PHY header including the wireless communication network identifier (PID), and the PID includes the second level wireless communication network identifier (wild card PID) in which a plurality of first level wireless communication network identifiers (normal PIDs) are specified. Further, the receiving device receives the PHY header including the PID and receives the portion subsequent to the PHY header on the basis of the wild card PID. Therefore, a plurality of BSSs can be set as the destinations using one PID. Therefore, in the related art, as the number of BSSs serving as the destination increases, the size of the PHY header increases, but in the present embodiment, the size of the PHY header does not depend on the number of BSSs serving as the destination, and thus the size of the PHY header can be suppressed. Therefore, even in communication in which a plurality of BSSs are the destination, it is possible to suppress the decrease in the communication efficiency while maintaining the effect of reducing the power consumption caused by the use of the PHY header including the PID.

Further, the wild card PID includes the second level wireless communication network identifier (the unspecified wild card PID) in which all the normal PIDs are specified. Therefore, it is possible to switch a specific BSS or an unspecified BSS as the destination of the frame while maintaining the format of the PHY header including the PID. In a case in which an unspecified BSS is the destination, the communication device uses the format of the PHY header including no PID. Therefore, it is necessary for the communication device to support at least two types of formats. On the other hand, according to the present configuration, the communication device has only to support one type of format, and thus the process and the configuration can be simplified. Therefore, it is possible to reduce the processing load and the manufacturing cost of the communication device. Further, in the related art, it is difficult to receive the portion subsequent to the PHY header in a case in which the communication device does not participate in the BSS, that is, an association is unprocessed. On the other hand, in the present configuration, in a case in which the wild card PID is specified although the communication device does not participate in the BSS, it is possible to cause the communication device to operate to receive the portion subsequent to the PHY header. Therefore, it is possible to set the communication device that is unable to participate in the BSS as the communication object.

Further, the wild card PID includes a second level wireless communication network identifier (specified wild card PID) in which some of the normal PIDs are specified. Therefore, it is possible to narrow down the reception target by receiving the portion subsequent to the PHY header frame only in some of all the BSSs. Therefore, it is possible to suppress the waste of electric power in the receiving device.

Further, the specified wild card PID is selected on the basis of the purpose of the frame to be transmitted. Therefore, it is possible to narrow down the transmission destination of the frame to a certain BSS related to the purpose of the frame. Therefore, it is possible to suppress the waste of electric power since the wasteful reception process is omitted in the receiving device.

Further, the specified wild card PID is selected on the basis of the attribute of the frame to be transmitted. Therefore, it is possible to narrow down the BSS serving as the destination to a BSS more appropriate as the reception target using the attribute of frame closely related to the purpose of the frame. Further, it is possible to prevent the selection process of the wild card PID from being complicated using uniform information such as the attribute of the frame.

Further, the specified wild card PID is selected on the basis of the attribute of the transmission destination of the frame to be transmitted. For this reason, it is possible to narrow down the BSS serving as the destination to a BSS more appropriate as the reception target using the transmission destination of the frame which is one of factors for deciding the purpose of the frame. Further, in a case in which the wild card PID in which the BSS to which the transmission destination belongs is selected, it is possible to reduce a possibility that an inappropriate BSS will be included in the PID specified from the wild card PID.

Further, the PHY header includes the link direction identification information. Therefore, it is possible to narrow down the reception target in further detail since the communication device is further specified in addition to the BSS. Therefore, it is possible to suppress the power consumption of the receiving device more effectively.

Further, the link direction identification information includes the downlink identification information. Therefore, it is possible to determine whether communication related to the frame is uplink communication or downlink communication. Therefore, it is possible to prevent a frame which is not the reception target from being received with a high degree of certainty by determining whether or not the frame can be received depending on whether or not one's own device operates as either the AP or the STA. Further, the link direction identification information may be the uplink identification information as described above.

Further, the transmitting device connects the data addressed to the device belonging to the network related to the normal PID specified from the wild card PID and transmits the connected data as the portion subsequent to the PHY header. Therefore, the data addressed to the receiving device belonging to the BSS related to the PID specified from the wild card PID can be transmitted collectively. Therefore, the number of communications addressed to the same BSS is reduced, and thus it is possible to improve the use efficiency of wireless communication resources and reduce the power consumption of the receiving device.

Further, the PID includes information identifying the BSS in the physical layer. Therefore, the receiving device can determine whether or not the reception can be performed on the basis of information such as the COLOR information of the existing BSS. Therefore, since the existing communication format is used, it is possible to divert the existing transmission/reception process and suppress the increase in the cost of the device.

Further, the receiving device receives the portion subsequent to the PHY header in accordance with whether or not the receiving device belongs to the target wireless communication network (target BSS) related to the normal PID specified from the wild card PID. In the related art, the PID and BSS correspond to each other in a one-to-one manner, and if a BSS serving as the destination is added, a PID to be stored in the PHY header is added. On the other hand, according to the present configuration, it is possible for the receiving device side to designate a smaller number of PIDs than the BSS serving as the destination by determining whether or not one's own BSS is the reception target on the basis of the wild card PID. Therefore, it is possible to suppress the increase in the size of the PHY header and suppress the decrease in the communication efficiency.

Further, the receiving device also controls the pause of the communication process during the transmission period of the portion subsequent to the PHY header in accordance with whether or not the portion subsequent to the PHY header is received. Here, since even transmission of the receiving device is suppressed in the transmission period of the frame which is not the reception target, the receiving device has no problem although the communication process is stopped. Therefore, it is possible to reduce the power consumption of the communication device with no disadvantages.

Further, the receiving device controls the setting of the transmission stop period of the receiving device for the transmission period of the portion subsequent to the PHY header on the basis of the reception signal strength of the PHY header depending on whether or not the portion subsequent to the PHY header is received. Here, even in a case in which the PHY header is received, in a case in which the reception signal strength is weak, although the receiving device transmits the frame during the transmission period of the portion subsequent to the PHY header, influence on the portion subsequent to the PHY header us considered to be small. Therefore, in a case in which the reception signal strength is weak, since no NAV is set, it is possible to efficiently use the wireless communication resources.

Further, in a case in which the receiving device belongs to the target BSS, the receiving device receives the portion subsequent to the PHY header in accordance with the link direction identification information of the PHY header. Therefore, since only the frame in which the link direction indicates the receiving device, it is possible to reduce the processing load and the power consumption in the reception process for the frame not addressed to the receiving device.

2. Second Embodiment (Communication Using Direct Link Identification Information)

The first embodiment of the present disclosure has been described above. Next, a second embodiment of the present disclosure will be described.

In the related art, it is difficult for the communication device to determine whether or not the communication device is the reception target unless the entire frame is received. For example, since the information in which the reception target is specified is stored in the MAC header, the communication device first decodes the MAC header. On the other hand, in order to determine whether or not there is no error in the MAC header, information such as an FCS at the tail of the frame is used. Therefore, in order to determine whether or not one's own device is the reception target, it is necessary to decode up to the tail of the frame uniformly even in a case in which one's own device is not the reception target as a result. As a result, the unnecessary reception process is performed in the communication device which is not the reception target, and the reduction of the power consumption is hindered.

On the other hand, several techniques for narrowing down the reception target have been proposed. However, there is a need for a technique of reduce the power consumption more efficiently. In this regard, in the present embodiment, communication using a PHY header including two pieces of information in which direct link communication is specified is performed. This will be described below in detail. Further, description that is substantially the same as in the first embodiment will be omitted.

2-1. Details of Functions of Device

First, functions of a communication device 100-2 (200-2) according to the present embodiment will be described in detail. Further, similarly to the first embodiment, the transmitting device and the receiving device will be described separately.

(A. Functions of Transmitting Device)

First, functions of the transmitting device will be described. Further, since a difference between the present embodiment and the first embodiment lies in a link direction identification information setting function and a PHY header transmission function, the description will proceed with these functions.

(A.2. Setting of Link Direction Identification Information)

The transmitting device sets direct link identification information for the frame to be transmitted as the link direction identification information. Specifically, the direct link identification information includes two pieces of identification information for identifying the direct link communication. For example, the direct link identification information is a set of the uplink identification information and the downlink identification information. More specifically, the control unit 120 sets the uplink indicator to 0 and sets the downlink indicator to 0 in a case in which the frame to be transmitted is a direct link frame, that is, a frame from the STA to the STA.

(A-3. Transmission of PHY Header)

The transmitting device transmits a frame including a PHY header including the direct link identification information for identifying direct link communication. Specifically, both the uplink indicator and the downlink indicator are stored in the PHY header. Further, the normal PID or the wild card PID may be stored in the PHY header.

Further, the transmitting device connects data addressed to a direct link communication adaptive device and transmits the connected data as the portion subsequent to the PHY header. For example, in a case in which there are a plurality of pieces of data addressed to a communication device adaptive to the direct link communication, the control unit 120 causes the data processing unit 110 to generate data payloads related to the plurality of pieces of data and connects the generated data payloads. Then, the wireless communication unit 130 transmits the frame including the connected data payloads subsequently to the PHY header. Further, the plurality of pieces of data may be narrowed down to data addressed to the communication device belonging to the BSS related to the normal PID specified from the normal PID or the wild card PID.

(B. Functions of Receiving Device)

Next, functions of the receiving device will be described. Further, a difference between the present embodiment and the first embodiment lies in a subsequent process determination function, and thus the description will proceed only with this function.

(B-2. Determination of Subsequent Process)

The receiving device receives the portion subsequent to the PHY header on the basis of two pieces of information for identifying the direct link communication included in the PHY header. Specifically, in a case in which the direct link communication is identified by the uplink identification information and the downlink identification information, the receiving device receives the portion subsequent to the PHY header on the basis of whether or not the receiving device is an STA that should receive the direct link communication. For example, in a case in which the direct link identification information provided from the wireless communication unit 130 indicates the direct link (that is, the uplink indicator is 0, and the downlink indicator is 0), and the receiving device is an STA that should receive the direct link communication, the control unit 120 determines that the portion subsequent to the PHY header is received.

Further, the receiving device receives the portion subsequent to the PHY header on the basis of whether or not the receiving device is adaptive to the direct link communication. For example, in a case in which the direct link identification information indicates the direct link, and the receiving device is an STA that should receive the direct link communication, the control unit 120 determines whether or not the receiving device is adaptive to the direct link communication. In a case in which the receiving device is adaptive to the direct link communication, the control unit 120 determines that the portion subsequent to the PHY header is received. Further, even in a case in which the receiving device is adaptive to the direct link communication, it may be determined whether or not the portion subsequent to the PHY header is received in accordance with a setting of the presence/absence of the direct link communication. Accordingly, it is possible to further narrow down the frames to be received by the receiving device, and it is possible to further suppress the waste of electric power.

Further, in a case in which the PHY header includes a PID, the receiving device receives the portion subsequent to the PHY header in accordance with whether or not the receiving device belongs to the wireless communication network related to the PID. For example, in a case in which the PHY header includes the normal PID, the control unit 120 determines whether or not the portion subsequent to the PHY header is received in accordance with whether or not the normal PID is a PID related to one's own BSS. Further, in a case in which the PHY header includes the specified wild card PID, the control unit 120 determines whether or not the portion subsequent to the PHY header is received in accordance with whether or not the PID related to one's own BSS is included in the PID specified from the specified wild card PID. Further, in a case in which the PHY header includes the unspecified wild card PID, the control unit 120 determines that the portion subsequent to the PHY header is received.

Further, in a case in which the format of the PHY header is unable to be recognized, the receiving device may receive the PHY header as the format of the PHY header according to the related art. Specifically, in a case in which at least one of the two pieces of information which are the direct link identification information is unable to be recognized, the receiving device receives the portion subsequent to the PHY header. For example, in a case in which either or both of the uplink indicator and the downlink indicator are unable to be recognized, the wireless communication unit 130 ignores the information which is unable to be recognized and acquires the other information.

2-2. Process of Device

Then, a process of the communication device 100-2 (200-2) according to the present embodiment will be described. Further, description of processes which are substantially the same as in the first embodiment will be omitted.

(Process of Transmitting Device)

Figure 13:
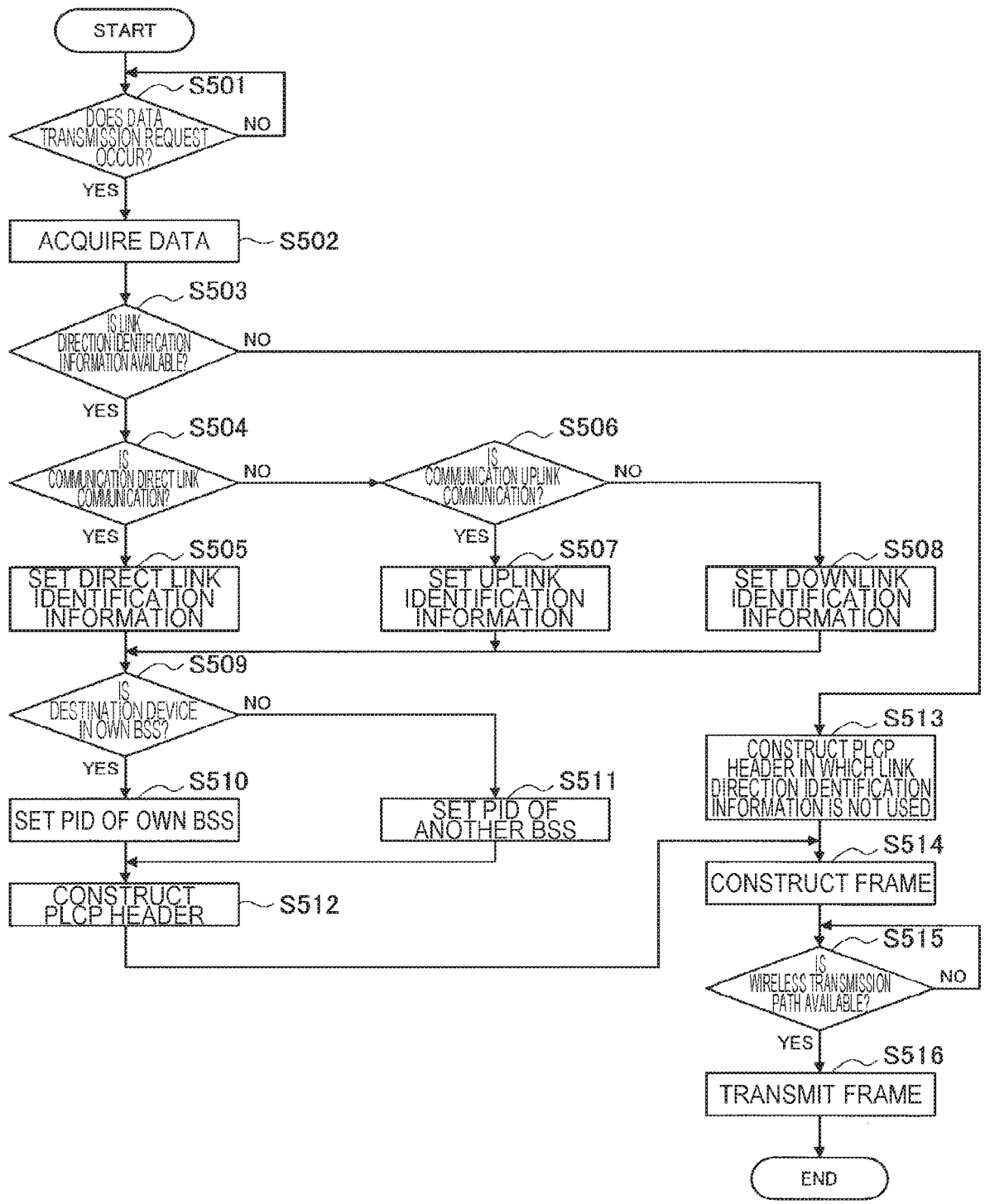
FIG. 13 is a flowchart conceptually illustrating a process of a transmitting device according to a second embodiment of the present disclosure.

First, a process of the communication device 100-2 (200-2) operating as the transmitting device will be described with reference to FIG. 13. FIG. 13 is a flowchart conceptually illustrating the process of the transmitting device according to the present embodiment.

If the data transmission request occurs (step S501), the transmitting device acquires data related to the data transmission request (step S502).

Then, the transmitting device determines whether or not the link direction identification information is available (step S503). Specifically, the control unit 120 determines whether or not the PLCP header including both the uplink indicator and the downlink indicator is available.

If the link direction identification information is determined to be available, the transmitting device determines whether or not communication of the data related to the transmission request is the direct link communication (step S504). Specifically, the control unit 120 determines whether or not the data communication is communication between the STAs. For example, it is determined whether or not the communication of the data is the direct link communication on the basis of the destination or the attribute of the data.

If the communication of the data is determined to be the direct link communication, the transmitting device sets the direct link identification information (step S505). Specifically, if the data communication is determined to be the communication between the STAs, the control unit 120 sets the uplink indicator to 0 and sets the downlink indicator to 0.

If the communication of the data is determined not to be the direct link communication, the transmitting device determines whether or not the communication of the data is the uplink communication (step S506). Specifically, if the data communication is determined not to be the communication between the STAs, the control unit 120 determines whether or not the data communication is communication from the STA to the AP.

If the communication of the data is determined to be the uplink communication, the transmitting device sets the uplink identification information (step S507). Specifically, if the data communication is determined not to be the communication from the STA to the AP, the control unit 120 sets the uplink indicator to 1 and sets the downlink indicator to 0.

If the communication of the data is determined not to be the uplink communication, the transmitting device sets the downlink identification information (step S508). Specifically, if the data communication is determined not to be the communication from the STA to the AP, the control unit 120 sets the uplink indicator to 0 and sets the downlink indicator to 1.

Then, the transmitting device determines whether or not the destination of the data related to the transmission request is a device in one's own BSS (step S509). Specifically, the control unit 120 determines whether or not the device serving as the destination of data belongs to the same BSS as the BSS to which the transmitting device belongs.

If the destination is determined to be a device in one's own BSS, the transmitting device sets the PID of one's own BSS (step S510). Specifically, in a case in which the device serving as the destination of data belongs to one's own BSS, the control unit 120 sets the COLOR information related to one's own BSS as the COLOR information to be included in the PHY header.

If the destination is determined not to be a device in one's own BSS, the transmitting device sets the PID of another BSS (step S511). Specifically, in a case in which the device serving as the destination of data does not belong to one's own BSS, the control unit 120 sets the COLOR information related to the BSS to which the device serving as the destination of the data belongs as the COLOR information to be included in the PHY header.

Then, the transmitting device constructs a PLCP header (step S512). Further, if it is determined in step S503 that the link direction identification information is not available, the transmitting device constructs a PLCP header in which the link direction identification information is not used (step S513).

Then, the transmitting device constructs a frame (step S514), and determines whether or not the wireless transmission path is available (step S515). If the wireless transmission path is determined to be available, the transmitting device transmits the frame (step S516).

(Process of Receiving Device)

Figure 14:
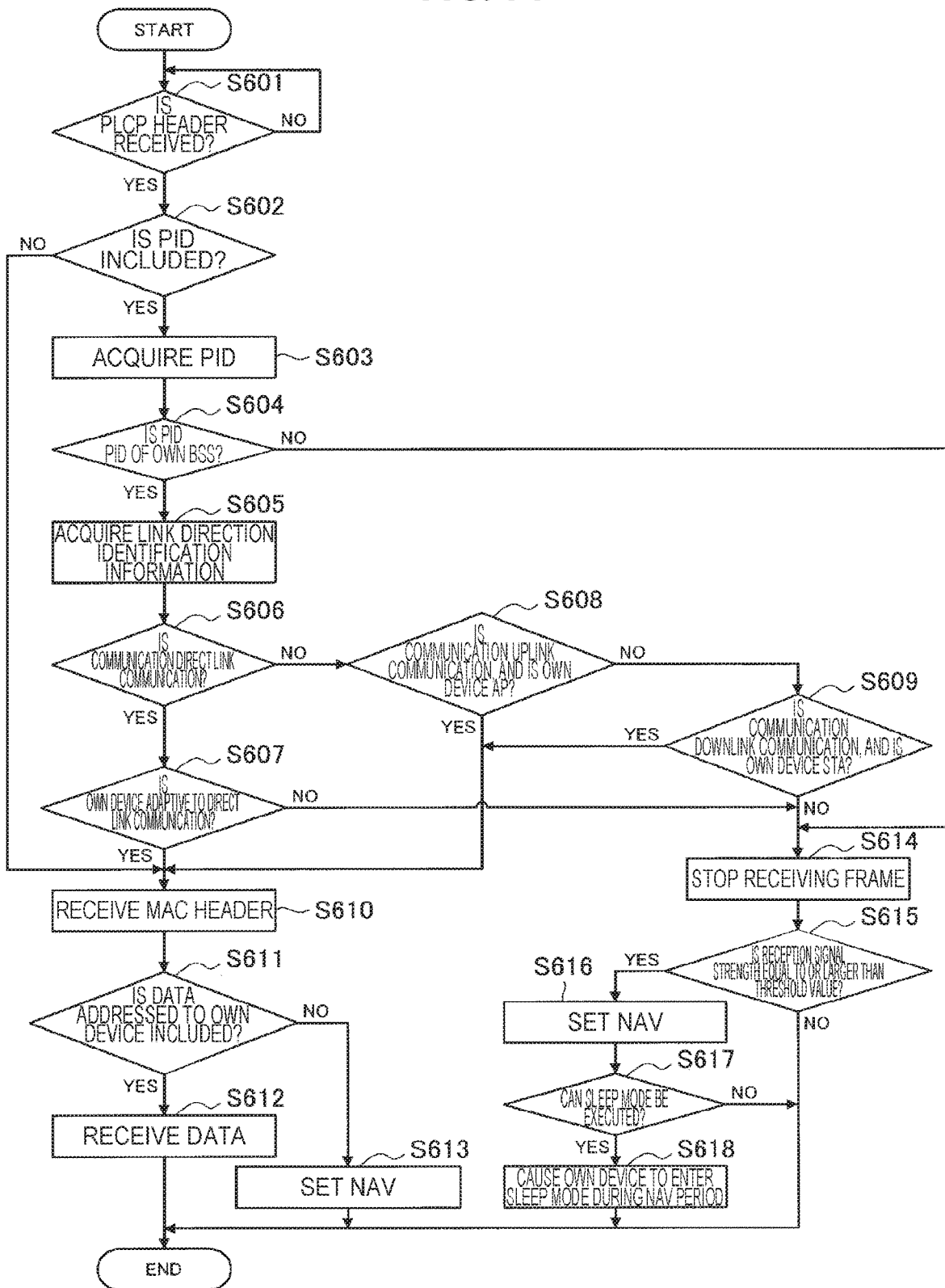
FIG. 14 is a flowchart conceptually illustrating a process of a receiving device according to the embodiment.

Then, a process of the communication device 100-2 (200-2) operating as the receiving device will be described with reference to FIG. 14. FIG. 14 is a flowchart conceptually illustrating a process of the receiving device according to the present embodiment.

In a case in which the PLCP header is received (step S601), the receiving device determines whether or not the PID is included in the PLCP header (step S602). Specifically, in a case in which the PLCP is received, the wireless communication unit 130 determines whether or not the COLOR information is included in the PLCP header.

If the PID is determined to be included in the PLCP header, the receiving device acquires the PID (step S603). Specifically, in a case in which the COLOR information is included in the PLCP header, the wireless communication unit 130 provides the COLOR information to the control unit 120.

Then, the receiving device determines whether or not the acquired PID is the PID of one's own BSS (step S604). Specifically, the control unit 120 determines whether or not the COLOR information provided from the wireless communication unit 130 coincides with the normal COLOR information of the first level related to one's own BSS. Further, in a case in which the COLOR information is the wild card COLOR information as the COLOR information of the second level, the control unit 120 may determine that the wild card COLOR information is the COLOR information of the second level indicating that the portion subsequent to the PHY header should be received.

In a case in which the acquired PID is determined to be the PID of one's own BSS, the receiving device acquires the link direction identification information (step S605). Specifically, the control unit 120 acquires the uplink indicator and the downlink indicator acquired from the PLCP header from the wireless communication unit 130.

Then, the receiving device determines whether or not the communication related to the PLCP header is the direct link communication on the basis of the link direction identification information (step S606). Specifically, the control unit 120 determines whether or not the uplink indicator is 0, and the downlink indicator is 0.

In a case in which the communication is determined to be the direct link communication, the receiving device determines whether or not the receiving device is adaptive to the direct link communication (step S607). Specifically, if it is determined that the uplink indicator is 0, and the downlink indicator is 0, the control unit 120 determines whether or not the receiving device is adaptive to the direct link communication. Further, the control unit 120 may determine whether or not the receiving device is adaptive to the direct link communication and set to permit the direct link communication.

Further, if it is determined in step S606 that the communication is not the direct link communication, the receiving device determines whether or not the communication is the uplink communication when the receiving device is the AP (step S608). Specifically, when the receiving device is the AP, the control unit 120 determines whether or not the uplink indicator is 1, and the downlink indicator is 0.

If it is determined that the receiving device is the AP, and the communication is not the uplink communication, the receiving device determines whether or not the communication is downlink communication when the receiving device is the STA (step S609). Specifically, in a case in which the receiving device is the STA, the control unit 120 determines whether or not the uplink indicator is 0, and the downlink indicator is 1.

In a case in which it is determined in step S607 that the receiving device is adaptive to the direct link communication, in a case in which it is determined in step S608 that the receiving device is the AP, and the communication is the uplink communication, or in a case in which it is determined in step S609 that the receiving device is the STA, and the communication is the downlink communication, the receiving device receives the MAC header (step S610). Further, even in a case in which it is determined in step S602 that the PID is not included, the process proceeds to step S610.

Then, the receiving device determines whether or not data addressed to the receiving device is included in the frame (step S611). If the data addressed to the receiving device is determined to be included in the frame, the receiving device receives the data (step S612), and if the data addressed to the receiving device is determined not to be included in the frame, the receiving device set the NAV (step S613).

In a case in which it is determined in step S604 that the acquired PID is not the PID of one's own BSS, in a case in which it is determined in step S607 that the receiving device is not adaptive to the direct link communication, or in a case in which it is not determined in step S609 that the receiving device is the STA, and the communication is the downlink communication, the receiving device stops receiving the frame (step S614).

Then, the receiving device determines whether or not the reception signal strength is equal to or larger than a threshold value (step S615), and if the reception signal strength is determined to be equal to or larger than a threshold value, the receiving device sets the NAV (step S616).

Then, the receiving device determines whether or not the sleep mode can be executed (step S617), and in a case in which the sleep mode can be executed, the receiving device causes the receiving device to enter the sleep mode during the NAV period (step S618).

2-3. Operation Example

Figure 15:
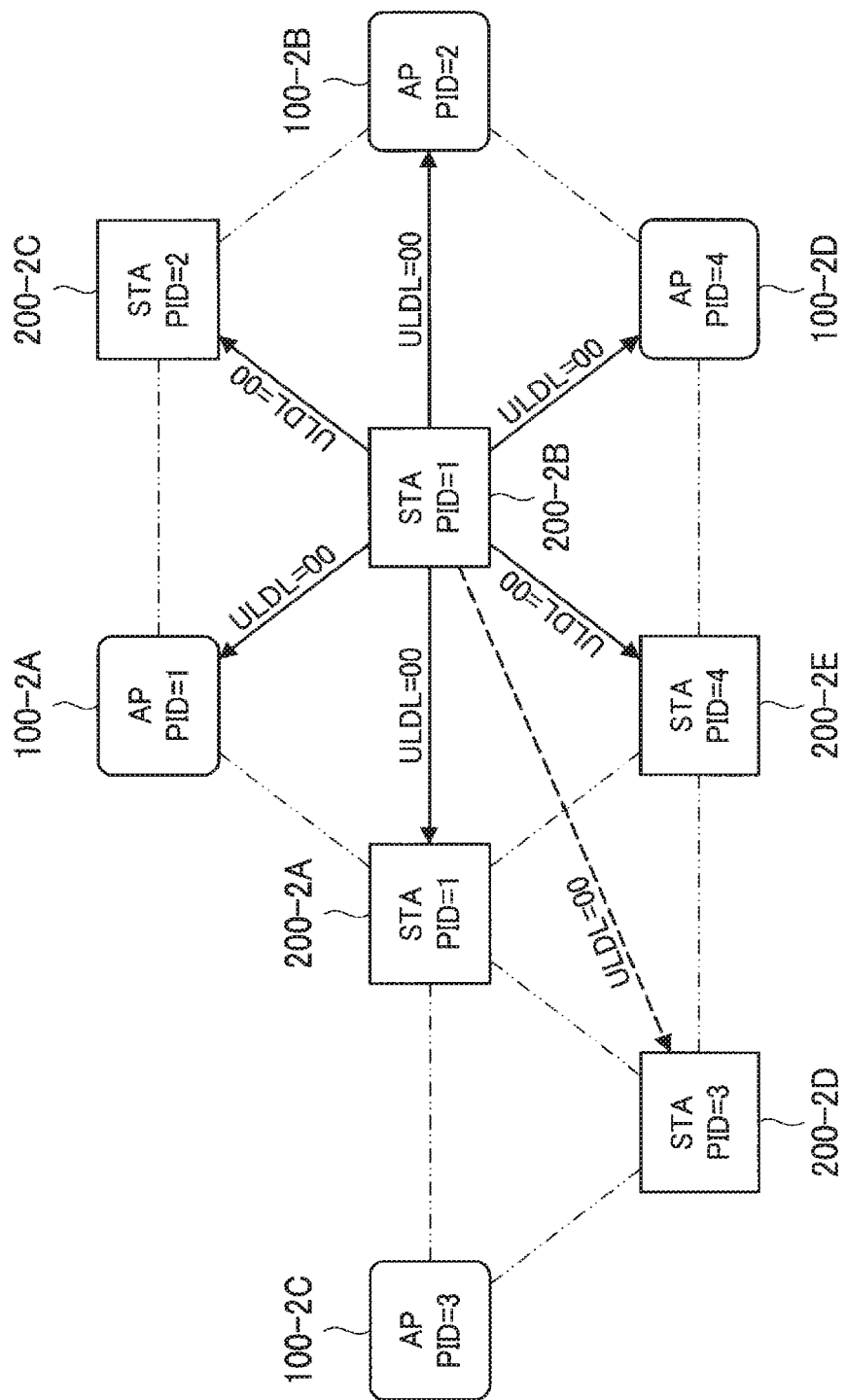
FIG. 15 is a schematic diagram for describing an example of communication using direct link identification information in a communication system according to the embodiment.
Figure 16:
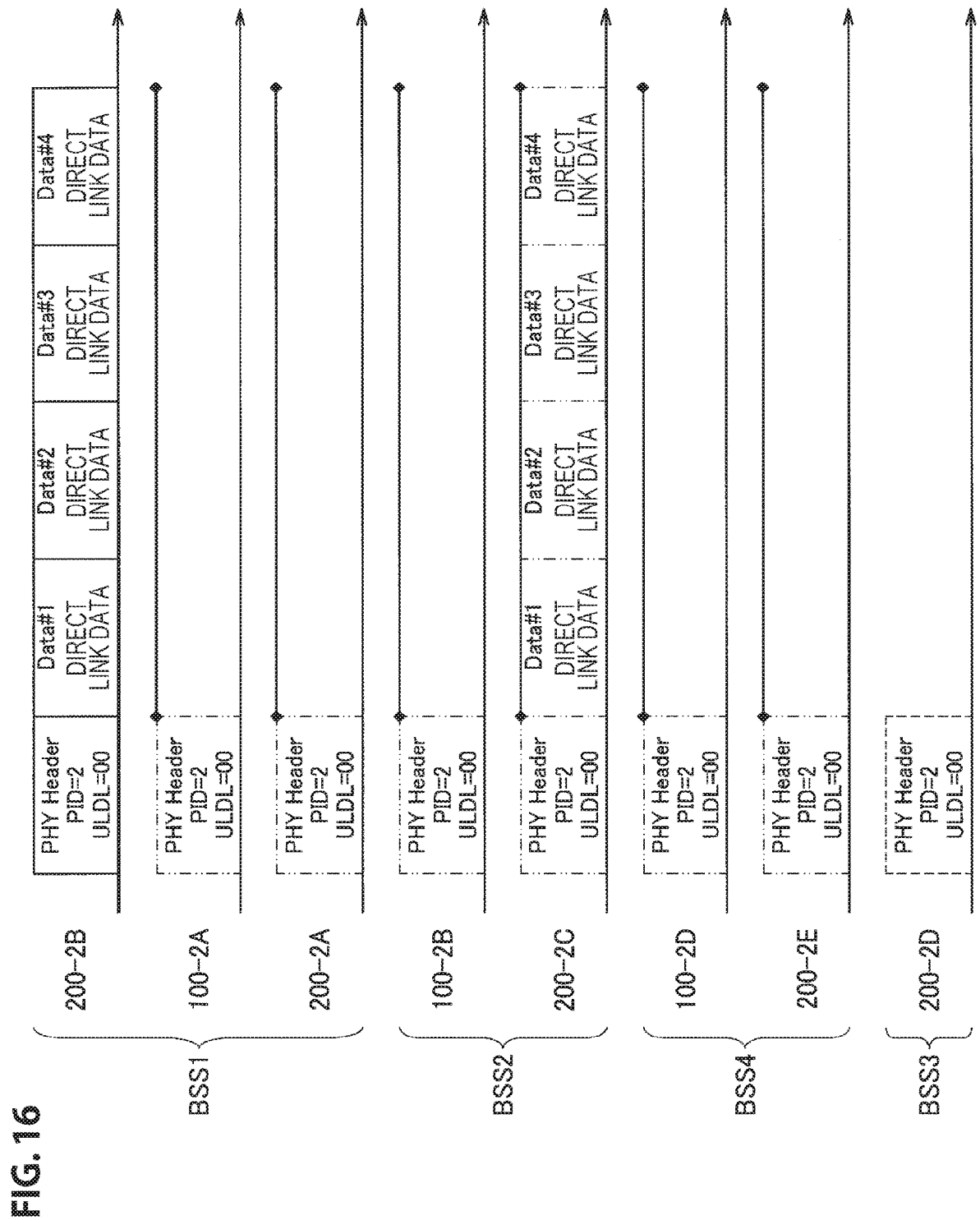
FIG. 16 is a frame sequence diagram for describing an example of communication using direct link identification information in a communication system according to the embodiment.

The functions and the processes of the communication device 100-2 (200-2) according to the present embodiment have been described above. Then, an example of communication using the direct link identification information will be described with reference to FIGS. 15 and 16. FIG. 15 is a schematic diagram for describing an example of communication using the direct link identification information in the communication system according to the present embodiment, and FIG. 16 is a frame sequence diagram for describing an example of communication using the direct link identification information in the communication system according to the present embodiment.

For example, a case in which an STA 200-2B illustrated in FIG. 15 performs communication using the direct link identification information as the transmitting device is considered.

First, the transmitting device transmits a PHY header including the direct link identification information as the link direction identification information. For example, as illustrated in FIG. 15, the STA 200-2B transmits a frame including a PHY header in which the uplink indicator is 0, and the downlink indicator is 0 to APs 100-2A, 100-2B, and 100-2D and STAs 200-2A and 200-2C to 200-2E.

The receiving device that has received the PHY header determines whether or not the receiving device is the reception target on the basis of the PID and the direct link identification information included in the PHY header. For example, each receiving device that has received the PHY header from the STA 200-2B determines whether or not the PID included in the PHY header is the PID related to one's own BSS. Further, since both the uplink indicator and the downlink indicator included in the PHY header are 0, each receiving device determines whether or not the receiving device is the STA and adaptive to the direct link communication.

Then, the receiving device receives the portion subsequent to the PHY header on the basis of a determination result of the reception target. For example, since the PID included in the PHY header is 2 and both the uplink indicator and the downlink indicator are 0, only the STA 200-2C which belongs to the BSS 2 whose PID is 2 and is adaptive to the direct link communication is the reception target. Therefore, as illustrated in FIG. 12, the STA 200-2C receives the portion subsequent to the PHY header and acquires data addressed to the direct link communication adaptive device. Further, other communication devices set the NAV in the transmission period of the portion subsequent to the PHY header. Further, the receiving device that sets the NAV may cause the communication function to enter the sleep mode for a period corresponding to the NAV period. Further, the STA 200-2D in which the reception signal strength of the PHY header is less than a threshold value stops receiving the portion subsequent to the PHY header but does not set the NAV

2-4. Conclusion of Second Embodiment

Thus, according to the second embodiment of the present disclosure, the transmitting device transmits the PHY header including the two pieces of information for identifying the direct link communication. Further, the receiving device receives the PHY header including the two pieces of information for identifying the direct link communication, and receives the portion subsequent to the PHY header on the basis of the two pieces of information. Therefore, it is possible to reduce the size of information identifying whether or not the communication is the direct link communication as compared with the related art. Therefore, it is possible to suppress the increase in the power consumption necessary for receiving the data portion subsequent to the PHY header.

Further, the two pieces of information include the uplink identification information and the downlink identification information. Further, in a case in which the direct link communication is identified by the uplink identification information and the downlink identification information, the receiving device receives the portion subsequent to the PHY header on the basis of whether or not the receiving device is a station. Therefore, since the information that can be included in the PHY header is used, it is possible to identify whether or not the communication is the direct link communication without adding new information to the PHY header.

Further, the transmitting device connects the data addressed to the direct link communication adaptive device, and transmits the connected data as the portion subsequent to the PHY header. Therefore, it is possible to transmit data addressed to the STAs capable of performing the direct link communication collectively. Therefore, the number of communications related to the same data addressed to the STAs capable of performing the direct link communication is reduced, and it is possible to improve the use efficiency of wireless communication resources and reduce the power consumption of other receiving devices as well as the STA of the reception target.

Further, the PHY header includes the wireless communication network identifier. Further, the receiving device receives the portion subsequent to the PHY header in accordance with whether or not the receiving device belongs to the wireless communication network related to the wireless communication network identifier. Therefore, only STAs belonging to a specific BSS among STAs adaptive to the direct link communication can be set as the reception target. Therefore, it is possible to suppress the power consumption of the STA other than the STA belonging to the specific BSS.

Further, the receiving device receives the portion subsequent to the PHY header on the basis of whether or not the receiving device is adaptive to the direct link communication. Therefore, the STAs that are not adaptive to the direct link communication can be excluded from the reception target. Therefore, the waste of electric power can be further suppressed by narrowing down the reception target appropriately.

In a case in which at least one of the two pieces of information which are the direct link identification information is unable to be recognized, the receiving device receives the portion subsequent to the PHY header. Therefore, it is possible to cause even the receiving device that is not adaptive to the format of the PHY header including the PID to receive the frame. Therefore, it is possible to apply the configuration of the present embodiment to a network in which the communication device 100-2 (200-2) and the communication device of the related art coexist.

Further, in the above example, the example in which the direct link identification information is implemented by the uplink identification information and the downlink identification information has been described, but other two pieces of information may be used as the direct link identification information.

3. Third Embodiment (Communication Using Mesh Network Link Identification Information)

The second embodiment of the present disclosure has been described. Next, a third embodiment of the present disclosure will be described. In the present embodiment, communication using mesh network link identification information is performed instead of or in addition to the direct link identification information of the second embodiment.

3-1. Details of Functions of Device

First, functions of the communication device 100-3 (200-3) according to the present embodiment will be described in detail. Further, similarly to the second embodiment, the transmitting device and the receiving device will be described separately.

(A. Functions of Transmitting Device)

First, functions of the transmitting device will be described. Further, the description will proceed with a difference with the functions of the second embodiment.

(A.2. Setting of Link Direction Identification Information)

The transmitting device sets the mesh network link identification information for the frame to be transmitted as the link direction identification information. Specifically, the mesh network link identification information includes two pieces of identification information for identifying the mesh network communication. For example, the mesh network link identification information is a set of the uplink identification information and the downlink identification information. More specifically, in a case in which the frame to be transmitted is a frame related to the mesh network communication, the control unit 120 sets the uplink indicator to 1 and sets the downlink indicator to 1. Further, the mesh network communication is communication between all communication devices regardless of the AP and the STA.

(A-3. PHY Header Transmission)

The transmitting device transmits a PHY header including the mesh network link identification information for identifying the mesh network communication. Specifically, both the uplink indicator and the downlink indicator are stored in the PHY header.

Further, the transmitting device connects data addressed to a mesh network communication adaptive device, and transmits the connected data as the portion subsequent to the PHY header. For example, in a case in which there are a plurality of pieces of data addressed to the communication device adaptive to the mesh network communication, the control unit 120 causes the data processing unit 110 to generate data payloads related to the plurality of pieces of data and connects the generated data payloads. Then, the wireless communication unit 130 transmits the frame including the connected data payloads subsequently to the PHY header.

(B. Functions of Receiving Device)

Next, functions of the receiving device will be described. Further, the description will proceed with a difference with the functions of the second embodiment.

(B-2. Determination of Subsequent Process)

The receiving device receives the portion subsequent to the PHY header on the basis of the two pieces of information identifying the mesh network communication included in the PHY header. Specifically, in a case in which the mesh network communication is identified by the uplink identification information and the downlink identification information, the receiving device receives the portion subsequent to the PHY header on the basis of whether or not the receiving device is adaptive to the mesh network communication. For example, in a case in which the mesh network link identification information provided from the wireless communication unit 130 indicates the mesh network communication (that is, the uplink indicator is 1, and the downlink indicator is 1), the control unit 120 determines that the portion subsequent to the PHY header is received.

Further, the receiving device receives the portion subsequent to the PHY header on the basis of whether or not the receiving device is adaptive to the mesh network communication. For example, in a case in which the link direction identification information indicates the mesh network communication, the control unit 120 determines whether or not the receiving device is adaptive to the mesh network communication. In a case in which the receiving device is determined to be adaptive to the mesh network communication, the control unit 120 determines that the portion subsequent to the PHY header is received. Further, even in a case in which the receiving device is adaptive to the mesh network communication, it may be determined whether or not the portion subsequent to the PHY header is received in accordance with a setting of the presence/absence of the mesh network communication. As a result, it is possible to further narrow down the frames to be received by the receiving device, and it is possible to further suppress the waste of electric power.

3-2. Process of Device

Then, a process of the communication device 100-3 (200-3) according to the present embodiment will be described. Further, descriptions of processes which are substantially the same as those in the first or second embodiment will be omitted.

(Process of Transmitting Device)

Figure 17:
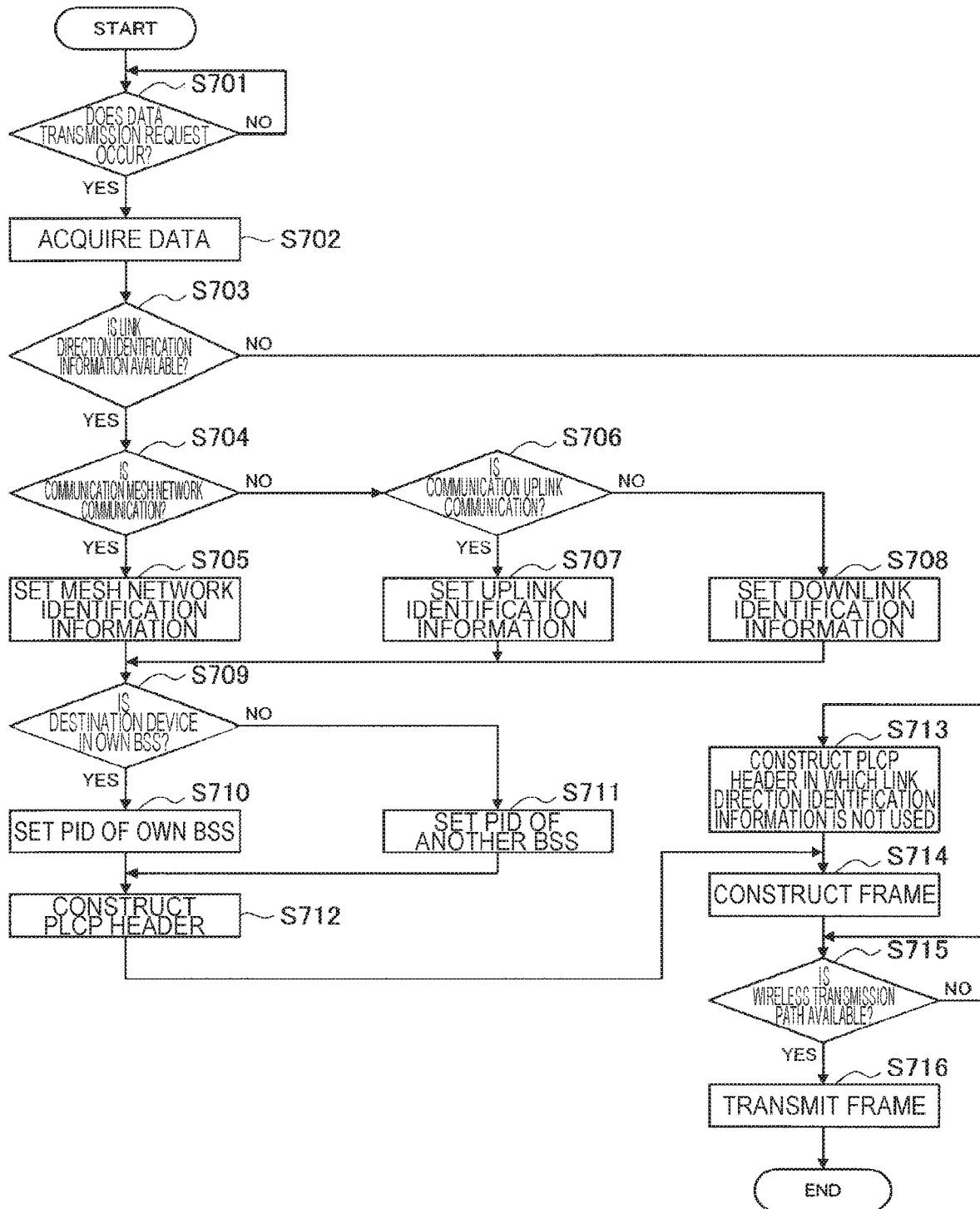
FIG. 17 is a flowchart conceptually illustrating a process of a transmitting device according to a third embodiment of the present disclosure.

First, a process of the communication device 100-3 (200-3) operating as the transmitting device will be described with reference to FIG. 17. FIG. 17 is a flowchart conceptually illustrating the process of the transmitting device according to the present embodiment.

If the data transmission request occurs (step S701), the transmitting device acquires data related to the data transmission request (step S702), and determines whether or not the link direction identification information is available (step S703).

If the link direction identification information is determined to be available, the transmitting device determines whether or not communication of the data related to the transmission request is the mesh network communication (step S704). Specifically, the control unit 120 determines whether or not the data communication is the mesh network communication on the basis of the destination or the attribute of the data.

If the communication of the data is determined to be the mesh network communication, the transmitting device sets the mesh network link identification information (step S705). Specifically, if the data communication is determined to be the mesh network communication, the control unit 120 sets the uplink indicator to 1 and sets the downlink indicator to 1.

If the communication of the data is determined not to be the mesh network communication, the transmitting device determines whether or not the communication of the data is the uplink communication (step S706), and if the communication of the data is determined to be the uplink communication, the uplink identification information is set (step S707).

If the communication of the data is determined not to be the uplink communication, the transmitting device sets the downlink identification information (step S708). Further, the transmitting device may further determine whether or not the data communication is the direct link communication and set the direct link identification information as in the second embodiment.

Then, the transmitting device determines whether or not the destination of the data related to the transmission request is a device in one's own BSS (step S709), and if the destination is determined to be a device in one's own BSS, the transmitting device transmits the PID of one's own BSS (step S710). If the destination is determined not to be a device in one's own BSS, the transmitting device sets the PID of another BSS (step S711).

Then, the transmitting device constructs a PLCP header (step S712). Further, if it is determined in step S703 that the link direction identification information is not available, the transmitting device constructs a PLCP header in which the link direction identification information is not used (step S713).

Then, the transmitting device constructs a frame (step S714) and determines whether or not the wireless transmission path is available (step S715). If the wireless transmission path is determined to be available, the transmitting device transmits the frame (step S716).

(Process of Receiving Device)

Figure 18:
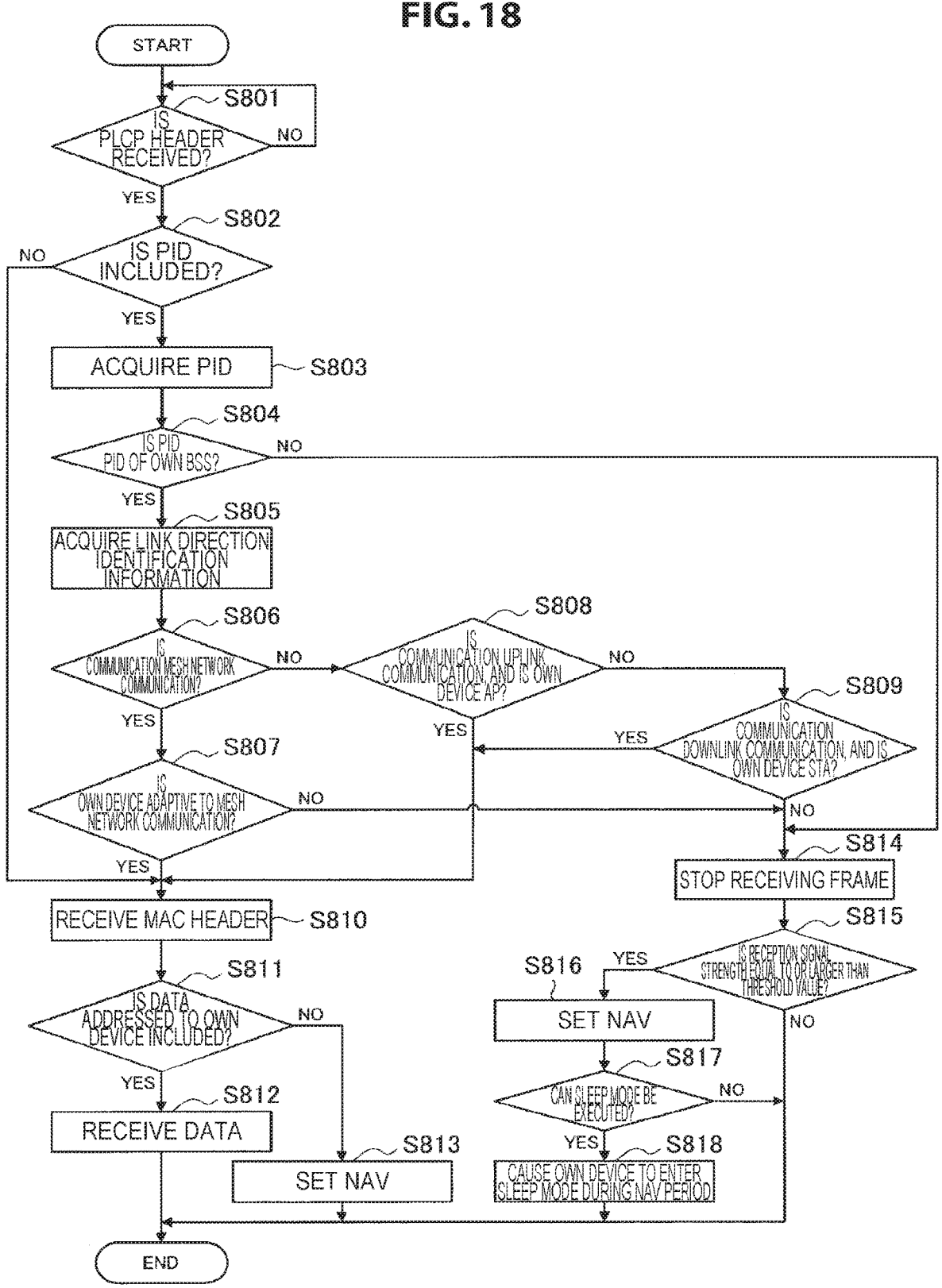
FIG. 18 is a flowchart conceptually illustrating a process of a receiving device according to the embodiment.

Then, a process of the communication device 100-3 (200-3) operating as the receiving device will be described with reference to FIG. 18. FIG. 18 is a flowchart conceptually illustrating the process of the receiving device according to the present embodiment.

If the PLCP header is received (step S801), the receiving device determines whether or not the PID is included in the PLCP header (step S802), and if the PID is determined to be included in the PLCP header, the receiving device acquires the PID (step S803).

Then, the receiving device determines whether or not the acquired PID is the PID of one's own BSS (step S804), and if the acquired PID is determined to be the PID of one's own BSS, the receiving device acquires the link direction identification information (step S805).

Then, the receiving device determines whether or not the communication related to the PLCP header is the mesh network communication on the basis of the link direction identification information (step S806). Specifically, the control unit 120 determines whether or not the uplink indicator is 1, and the downlink indicator is 1.

If the communication is determined to be the mesh network communication, the receiving device determines whether or not the receiving device is adaptive to the mesh network communication (step S807). Specifically, if it is determined that the uplink indicator is 1, and the downlink indicator is 1, the control unit 120 determines whether or not the receiving device is adaptive to the mesh network communication. Further, the control unit 120 may determine whether or not the receiving device is adaptive to the mesh network communication and is set to permit the mesh network communication.

Further, if it is determined in step S806 that the communication is not the mesh network communication, the receiving device determines whether or not the communication is the uplink communication when the receiving device is the AP (step S808).

If it is determined that the receiving device is the AP, and the communication is not the uplink communication, the receiving device determines whether or not the communication is downlink communication when the receiving device is the STA (step S809).

In a case in which it is determined in step S807 that the receiving device is adaptive to the mesh network communication, in a case in which it is determined in step S808 that the receiving device is the AP, and the communication is the uplink communication, or in a case in which it is determined in step S809 that the receiving device is the STA, and the communication is the downlink communication, the receiving device receives the MAC header (step S810). Further, even in a case in which it is determined in step S802 that the PID is not included, the process also proceeds to step S810.

Then, the receiving device determines whether or not data addressed to the receiving device is included in the frame (step S811). If the data addressed to the receiving device is determined to be included in the frame, the receiving device receives the data (step S812), and if the data addressed to the receiving device is determined not to be included in the frame, the receiving device set the NAV (step S813).

In a case in which it is determined in step S804 that the acquired PID is not the PID of one's own BSS, in a case in which it is determined in step S807 that the receiving device is not adaptive to the mesh network communication, or in a case in which it is not determined in step S809 that the receiving device is the STA, and the communication is the downlink communication, the receiving device stops receiving the frame (step S814).

Then, the receiving device determines whether or not the reception signal strength is equal to or larger than a threshold value (step S815), and if the reception signal strength is determined to be equal to or larger than a threshold value, the receiving device sets the NAV (step S816).

Then, the receiving device determines whether or not the sleep mode can be executed (step S817), and in a case in which the sleep mode can be executed, the receiving device causes the receiving device to enter the sleep mode during the NAV period (step S818).

3-3. Operation Example

Figure 19:
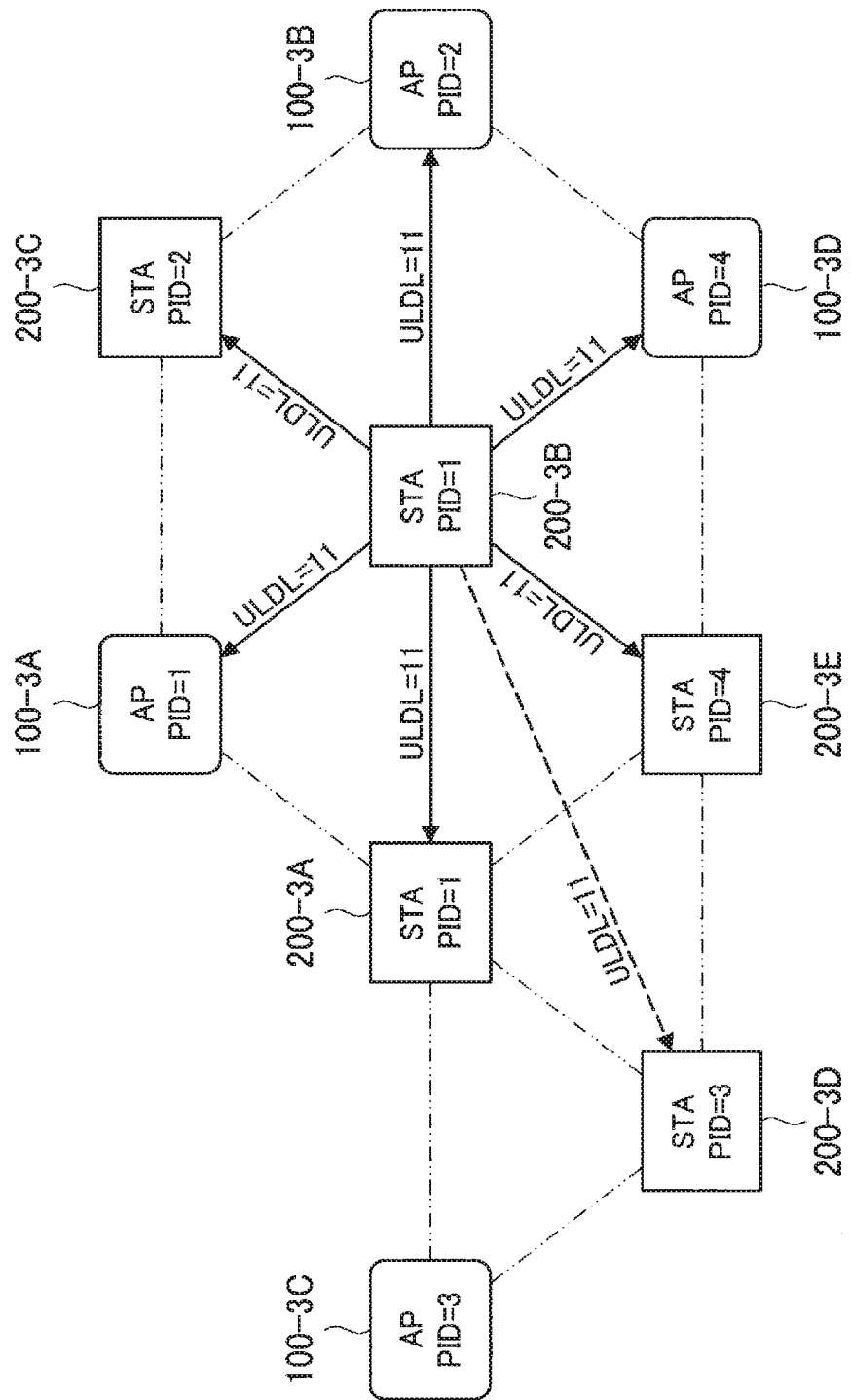
FIG. 19 is a schematic diagram for describing an example of communication using mesh network link identification information in a communication system according to the embodiment.
Figure 20:
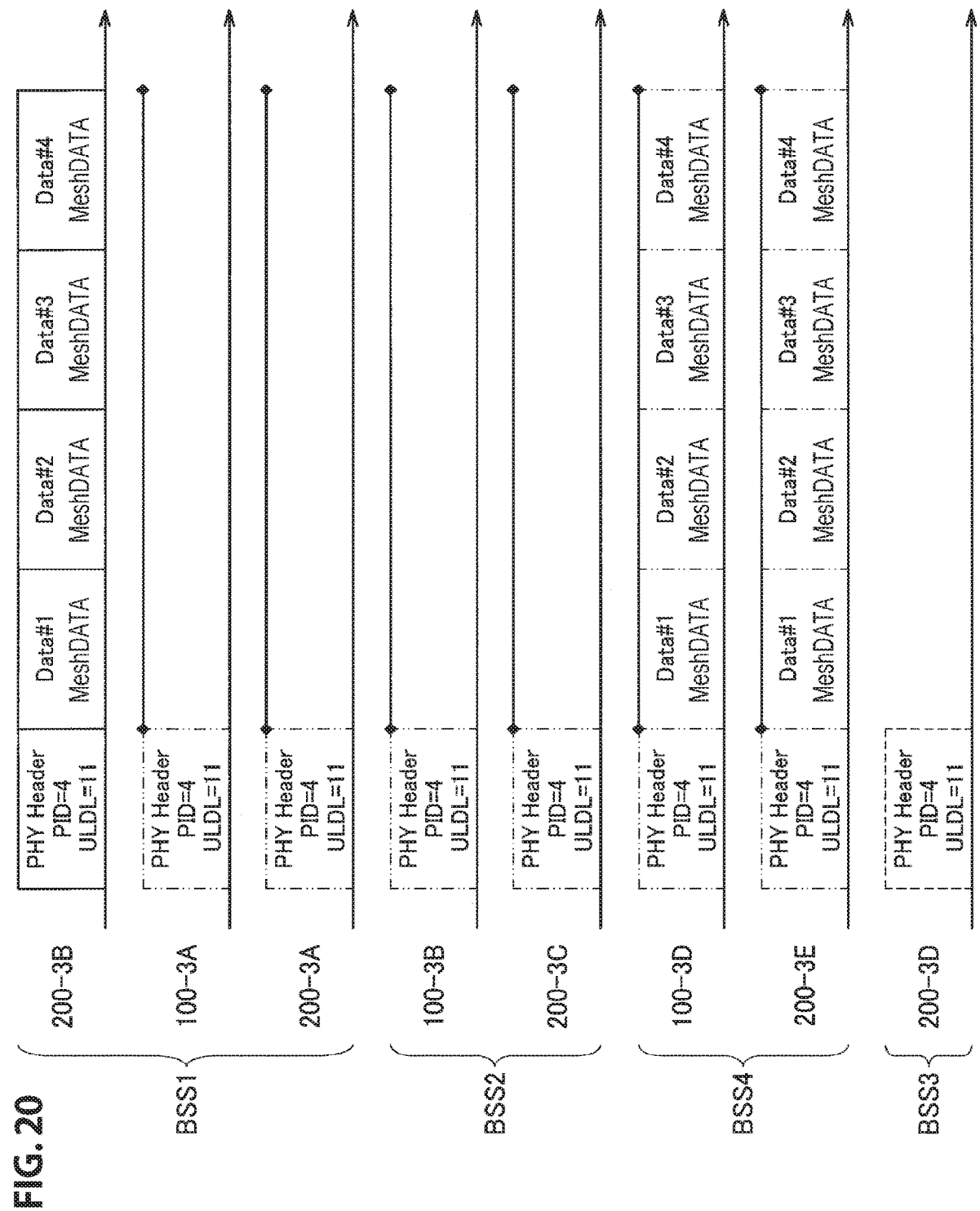
FIG. 20 is a frame sequence diagram for describing an example of communication using mesh network link identification information in a communication system according to the embodiment.

The functions and the processes of the communication device 100-3 (200-3) according to the present embodiment have been described above. Then, an example of communication using the mesh network link identification information will be described with reference to FIGS. 19 and 20. FIG. 19 is a schematic diagram for describing an example of communication using the mesh network link identification information in the communication system according to the present embodiment, and FIG. 20 is a frame sequence diagram for describing an example of communication using the mesh network link identification information in the communication system according to the present embodiment.

For example, a case in which an STA 200-3B illustrated in FIG. 19 performs communication using the mesh network link identification information as the transmitting device is considered.

First, the transmitting device transmits a PHY header including the mesh network link identification information as the link direction identification information. For example, as illustrated in FIG. 19, the STA 200-3B transmits a PHY header in which the uplink indicator is 1, and the downlink indicator is 1 to APs 100-3A, 100-3B, and 100-3D and STAs 200-3A and 200-3C to 200-3E.

The receiving device that has received the PHY header determines whether or not the receiving device is the reception target on the basis of the PID and the mesh network link identification information included in the PHY header. For example, each receiving device that has received the PHY header from the STA 200-3B determines whether or not the PID included in the PHY header is the PID related to one's own BSS. Further, since both the uplink indicator and the downlink indicator included in the PHY header are 1, each receiving device determines whether or not the receiving device is adaptive to the direct link communication.

Then, the receiving device receives the portion subsequent to the PHY header on the basis of a determination result of the reception target. For example, since the PID included in the PHY header is 4 and both the uplink indicator and the downlink indicator are 1, only the communication device which belongs to the BSS 4 whose PID is 4 and is adaptive to the mesh network communication is the reception target. Therefore, as illustrated in FIG. 20, the AP 100-3D and the STA 200-3C receive the portion subsequent to the PHY header and acquires data addressed to the mesh network communication adaptive device. Further, other communication devices set the NAV in the transmission period of the portion subsequent to the PHY header. Further, the receiving device that sets the NAV may cause the communication function to enter the sleep mode for a period corresponding to the NAV period. Further, the STA 200-3D in which the reception signal strength of the PHY header is less than a threshold value stops receiving the portion subsequent to the PHY header but does not set the NAV

3-4. Conclusion of Third Embodiment

Thus, according to the third embodiment of the present disclosure, the transmitting device transmits the PHY header including the two pieces of information for identifying the mesh network communication. Further, the receiving device receives the PHY header including the two pieces of information for identifying the mesh network communication, and receives the portion subsequent to the PHY header on the basis of the two pieces of information. Therefore, it is possible to reduce the increase in the size of information identifying whether or not the communication is the mesh network communication. Therefore, it is possible to suppress the increase in the power consumption necessary for receiving the data portion subsequent to the PHY header.

Further, the two pieces of information include the uplink identification information and the downlink identification information. Further, in a case in which the mesh network communication is identified by the uplink identification information and the downlink identification information, the receiving device receives the portion subsequent to the PHY header on the basis of whether or not the receiving device is adaptive to the mesh network communication. Therefore, since the information that can be included in the PHY header is used, it is possible to identify whether or not the communication is the mesh network communication without adding new information to the PHY header.

Further, the transmitting device connects the data addressed to the mesh network communication adaptive device, and transmits the connected data as the portion subsequent to the PHY header. Therefore, it is possible to transmit data addressed to the communication devices capable of performing the mesh network communication collectively. Therefore, the number of communications related to the same data addressed to the STAs capable of performing the mesh network communication is reduced, and it is possible to improve the use efficiency of wireless communication resources and reduce the power consumption of other receiving devices as well as the receiving device of the reception target.

Further, the PHY header includes the wireless communication network identifier. Further, the receiving device receives the portion subsequent to the PHY header in accordance with whether or not the receiving device belongs to the wireless communication network related to the wireless communication network identifier. Therefore, only communication devices belonging to a specific BSS among communication devices adaptive to the mesh network communication can be set as the reception target. Therefore, it is possible to suppress the power consumption of the communication device other than the communication device belonging to the specific BSS.

4. Application Example

The technology according to the present disclosure can be applied to various products. For example, the communication device 20 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the communication device 200 may be realized as terminals that perform machine to machine (M2M) communication (also referred to as machine type communication (MTC) terminals) such as smart meters, vending machines, remotely controlled monitoring devices, or point of sale (POS) terminals. Furthermore, the communication device 200 may be wireless communication modules mounted in such terminals (for example, integrated circuit modules configured by one die).

On the other hand, for example, the communication device 10 may be realized as a wireless LAN access point (also referred to as a wireless base station) which has a router function or does not have a router function. The communication device 100 may be realized as a mobile wireless LAN router. The communication device 100 may also be a wireless communication module (for example, an integrated circuit module configured with one die) mounted on such a device.

3-1. First Application Example

Figure 21:
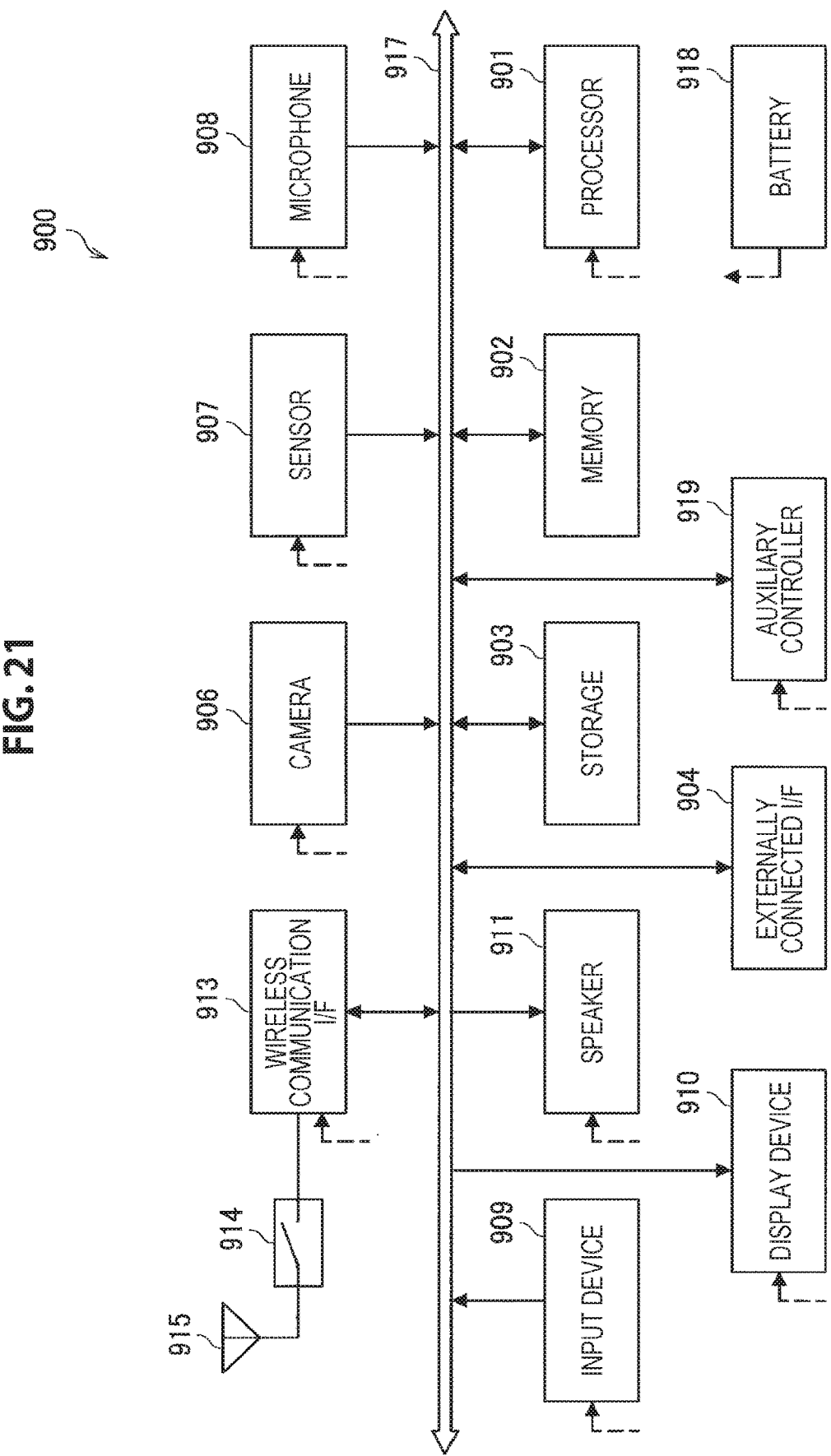
FIG. 21 is a block diagram illustrating an example of a schematic configuration of a smartphone.

FIG. 21 is a block diagram illustrating an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct link communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 21. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 21 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 21, the data processing unit 110, the control unit 120, and the wireless communication unit 130 described above with reference to FIG. 3 may be implemented in the wireless communication interface 913. Further, at least some of the functions may be implemented in the processor 901 or the auxiliary controller 919. For example, the smartphone 900 transmits the PHY header including the wild card PID or receives the portion subsequent to the PHY header on the basis of the wild card PID. In this case, it is possible to suppress the decrease in the communication efficiency while reducing the power consumption of the smartphone 900 or the communication counterpart. Further, the smartphone 900 transmits the PHY header including the direct link identification information or the mesh network link identification information or receives the portion subsequent to the PHY header on the basis of the identification information. In this case, it is possible to suppress the increase in the power consumption of the smartphone 900 or the communication counterpart which is necessary for receiving the PHY header capable of identifying the direct link communication or the mesh network communication.

Note that the smartphone 900 may operate as a wireless access point (software AP) as the processor 901 executes the function of an access point at an application level. In addition, the wireless communication interface 913 may have the function of a wireless access point.

4-2. Second Application Example

Figure 22:
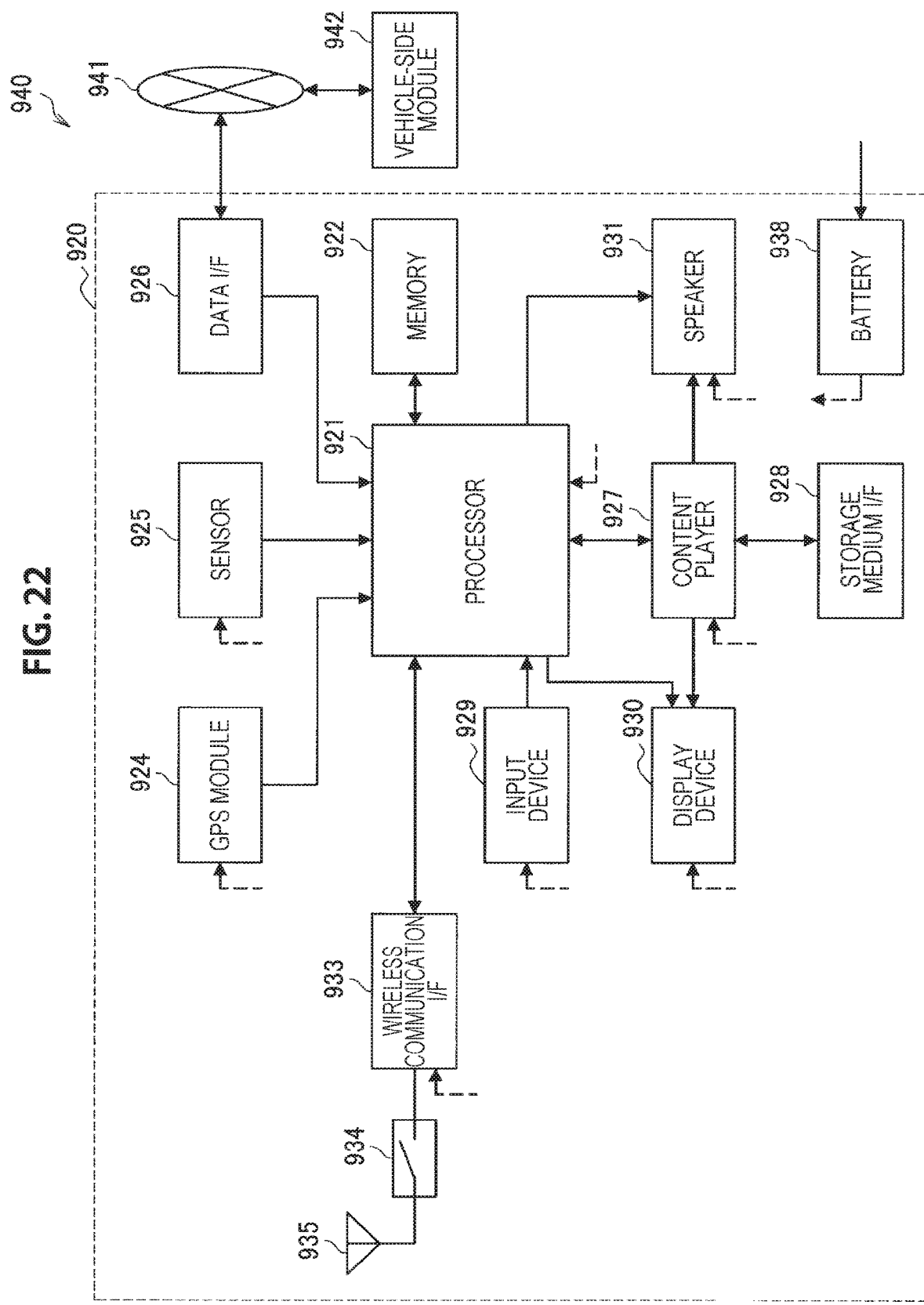
FIG. 22 is a block diagram illustrating an example of a schematic configuration of a car navigation device.

FIG. 22 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless communication. The wireless communication interface 933 can communicate with another device via a wireless LAN access point in the infrastructure mode. In addition, the wireless communication interface 933 can directly communicate with another device in a direct link communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 22. In this case, the antenna switch 934 may be omitted from the configuration of the car navigation device 920.

The battery 938 supplies electric power to each of the blocks of the car navigation device 920 illustrated in FIG. 22 via power supply lines partially indicated by dashed lines in the drawing. In addition, the battery 938 accumulates electric power supplied from the vehicle side.

In the car navigation device 920 illustrated in FIG. 22, the data processing unit 110, the control unit 120, and the wireless communication unit 130 described above with reference to FIG. 3 may be implemented in the wireless communication interface 933. Further, at least some of the functions may be implemented in the processor 921. For example, the car navigation device 920 transmits the PHY header including the wild card PID, or receives the portion subsequent to the PHY header on the basis of the wild card PID. In this case, it is possible to suppress the decrease in the communication efficiency while reducing the power consumption of the car navigation device 920 or the communication counterpart. Further, the car navigation device 920 transmits the PHY header including the direct link identification information or the mesh network link identification information or receives the portion subsequent to the PHY header on the basis of the identification information. In this case, it is possible to suppress the increase in the power consumption of the car navigation device 920 or the communication counterpart which is necessary for receiving the PHY header capable of identifying the direct link communication or the mesh network communication.

Further, the wireless communication interface 933 may operate as the communication device 100 and provide a wireless connection to a terminal carried by a user riding in the vehicle.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

Figure 23:
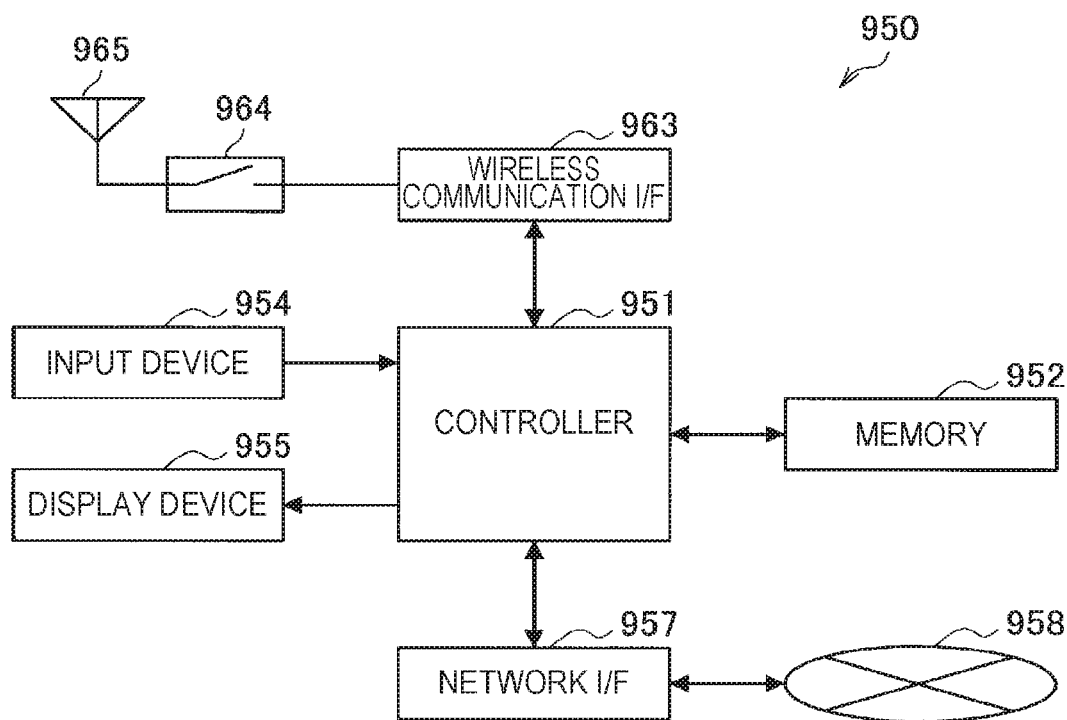
FIG. 23 is a block diagram illustrating an example of a schematic configuration of a wireless access point.

FIG. 23 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 23, the data processing unit 110, the control unit 120, and the wireless communication unit 130 described above with reference to FIG. 3 may be implemented in the wireless communication interface 963. Further, At least some of the functions may be implemented in the controller 951. For example, the wireless access point 950 transmits the PHY header including the wild card PID or receives the portion of the PHY header on the basis of the wild card PID. In this case, it is possible to suppress the decrease in the communication efficiency while reducing the power consumption of the wireless access point 950 or the communication counterpart. Further, the wireless access point 950 transmits the PHY header including the direct link identification information or the mesh network link identification information or receives the portion subsequent to the PHY header on the basis of the identification information. In this case, it is possible to suppress the increase in the power consumption of the wireless access point 950 or the communication counterpart which is necessary for receiving the PHY header capable of identifying the direct link communication or the mesh network communication.

5. Conclusion

As described above, according to the first embodiment of the present disclosure, a plurality of BSSs can be set as the destination using one PID. Therefore, according to the related art, as the number of BSSs serving as the destination increases, the size of the PHY header increases, but in the present embodiment, the size of the PHY header does not depend on the number of BSSs serving as the destination, and thus the size of the PHY header can be suppressed. Therefore, even in communication in which a plurality of BSSs are the destination, it is possible to suppress the decrease in the communication efficiency while maintaining the effect of reducing the power consumption caused by the use of the PHY header including the PID.

Further, according to the second embodiment of the present disclosure, it is possible to reduce the size of the information identifying whether or not the communication is the direct link communication as compared with the related art. Therefore, it is possible to suppress the increase in the power consumption necessary for receiving the PHY header.

Further, according to the third embodiment of the present disclosure, it is possible to suppress the increase in the size of information identifying whether or not communication is the mesh network communication. Therefore, it is possible to suppress the increase in the power consumption necessary for receiving the PHY header.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the direct link communication is communication between the STAs, but the present technology is not limited to such an example. For example, the direct link communication may be communication between APs.

Further, the configurations disclosed in the above respective embodiments may be recombined or combined, respectively. For example, the communication device 100 (200) may have all of the functions according to the first to third embodiments and operate in accordance with the functions.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

Further, it is possible to create a computer program causing hardware installed in the communication device to perform functions equivalent to the logical components of the communication device. A storage medium storing the computer program may also be provided.

Additionally, the present technology may also be configured as below.

(1)

A communication device, including:

a communication unit configured to transmit a frame including a physical layer (PHY) header including a wireless communication network identifier, in which the wireless communication network identifier includes a second level wireless communication network identifier in which a plurality of first level wireless communication network identifiers are specified.

(2)

The communication device according to (1), in which the second level wireless communication network identifier includes a second level wireless communication network identifier in which all the first level wireless communication network identifiers are specified.

(3)

The communication device according to (1) or (2), in which the wireless communication network identifier of the second level includes a second level wireless communication network identifier in which some of the first level wireless communication network identifiers are specified.

(4)

The communication device according to (3), in which the second level wireless communication network identifier in which some of the first level wireless communication network identifiers are specified is selected on a basis of a purpose of a frame to be transmitted.

(5)

The communication device according to (3) or (4), in which the second level wireless communication network identifier in which some of the first level wireless communication network identifiers are specified is selected on a basis of an attribute of the frame to be transmitted.

(6)

The communication device according to any one of (3) to (5), in which the second level wireless communication network identifier in which some of the first level wireless communication network identifiers are specified is selected on a basis of an attribute of a transmission destination of the frame to be transmitted.

(7)

The communication device according to any one of (1) to (6), in which the PHY header includes link direction identification information.

(8)

The communication device according to (7), in which the link direction identification information includes downlink identification information.

(9)

The communication device according to (7) or (8), in which the link direction identification information includes direct link identification information.

(10)

The communication device according to any one of (1) to (9), in which the communication unit connects data addressed to a device belonging to a network related to the first level wireless communication network identifier specified from the second level wireless communication network identifier, and transmits the connected data as a portion subsequent to the PHY header.

(11)

The communication device according to any one of (1) to (10), in which the wireless communication network identifier includes information identifying a Basic Service Set (BSS) in a physical layer.

(12)

A communication device, including:

a communication unit configured to receive a physical layer (PHY) header including a wireless communication network identifier, in which the wireless communication network identifier includes a second level wireless communication network identifier in which a plurality of first level wireless communication network identifiers are specified, and the communication unit receives a portion subsequent to the PHY header on a basis of the second level wireless communication network identifier.

(13)

The communication device according to (12), in which the communication unit receives the portion subsequent to the PHY header in accordance with whether or not the communication device belongs to a target wireless communication network related to the first level wireless communication network identifier specified from the second level wireless communication network identifier.

(14)

The communication unit according to (12) or (13), in which the communication unit controls pause of a communication process in a transmission period of the portion subsequent to the PHY header in accordance with whether or not the portion subsequent to the PHY header is received.

(15)

The communication unit according to any one of (12) to (14), in which the communication unit controls a setting of a transmission stop period of the communication device for the transmission period of the portion subsequent to the PHY header on a basis of a reception signal strength of the PHY header in accordance with whether or not the portion subsequent to the PHY header is received.

(16)

The communication device according to (13), in which, in a case in which the communication device belongs to the target wireless communication network, the communication unit receives the portion subsequent to the PHY header in accordance with link direction identification information of the PHY header.

(17)

A communication method, including:

transmitting, by a communication unit, a frame including a physical layer (PHY) header including a wireless communication network identifier, in which the wireless communication network identifier includes a second level wireless communication network identifier in which a plurality of first level wireless communication network identifiers are specified.

(18)

A communication method, including:

receiving, by a communication unit, a frame including a physical layer (PHY) header including a wireless communication network identifier, in which the wireless communication network identifier includes a second level wireless communication network identifier in which a plurality of first level wireless communication network identifiers are specified; and receiving, by the communication unit, a portion subsequent to the PHY header on a basis of the second level wireless communication network identifier.

Additionally, the present technology may also be configured as below.

(21)

A communication device including a communication unit configured to transmit a frame including a physical layer (PHY) header including two pieces of information for identifying direct link communication.

(22)

The communication device according to (21), in which the two pieces of information include uplink identification information and downlink identification information.

(23)

The communication device according to (21) or (22), in which the communication unit connects data addressed to a direct link communication adaptive device and transmits the connected data as a portion subsequent to the PHY header.

(24)

The communication device according to any one of (21) to (23), in which the PHY header includes a wireless communication network identifier.

(25)

A communication device including a communication unit configured to receive a physical layer (PHY) header including two pieces of information for identifying direct link communication and receive a portion subsequent to the PHY header on a basis of the two pieces of information.

(26)

The communication device according to (25), in which the two pieces of information include uplink identification information and downlink identification information, and in a case in which direct link communication is identified by using the uplink identification information and the downlink identification information, the communication unit receives the portion subsequent to the PHY header on a basis of whether or not the communication device is a station.

(27)

The communication device according to (25) or (26), in which the communication unit receives the portion subsequent to the PHY header on a basis of whether or not the communication device is adaptive to the direct link communication.

(28)

The communication device according to any one of (25) to (27), in which the PHY header includes a wireless communication network identifier, and the communication unit receives the portion subsequent to the PHY header in accordance with whether or not the communication device belongs to a wireless communication network related to the wireless communication network identifier.

(29)

A communication method including transmitting, by a communication unit, a frame including a physical layer (PHY) header including two pieces of information for identifying direct link communication.

(30)

A communication method including:

receiving, by a communication unit, a physical layer (PHY) header including two pieces of information for identifying direct link communication; and receiving a portion subsequent to the PHY header on a basis of the two pieces of information.

(31)

A communication device including a communication unit configured to transmit a frame including a physical layer (PHY) header including two pieces of information for identifying mesh network communication.

(32)

The communication device according to (31), in which the two pieces of information include uplink identification information and downlink identification information.

(33)

The communication device according to (31) or (32), in which the communication unit connects data addressed to a mesh network communication adaptive device and transmits the connected data as a portion subsequent to the PHY header.

(34)

The communication device according to any one of (31) to (33), in which the PHY header includes a wireless communication network identifier.

(35)

A communication device including a communication unit configured to receive a physical layer (PHY) header including two pieces of information for identifying mesh network communication and receive a portion subsequent to the PHY header on a basis of the two pieces of information.

(36)

The communication device according to (35), in which the two pieces of information include uplink identification information and downlink identification information, and in a case in which the mesh network communication is identified by using the uplink identification information and the downlink identification information, the communication unit receives the portion subsequent to the PHY header on a basis of whether or not the communication device is adaptive to the mesh network communication.

(37)

The communication device according to any one of (35) to (37), in which the communication unit receives the portion subsequent to the PHY header in a case in which at least one of the two pieces of information is not recognized.

(38)

The communication device according to any one of (35) to (37), in which the PHY header includes a wireless communication network identifier, and the communication unit receives the portion subsequent to the PHY header in accordance with whether or not the communication device belongs to a wireless communication network related to the wireless communication network identifier.

(39)

A communication method including transmitting, by a communication unit, a frame including a physical layer (PHY) header including two pieces of information for identifying mesh network communication.

(40)

A communication method including:

receiving, by a communication unit, a physical layer (PHY) header including two pieces of information for identifying mesh network communication; and receiving a portion subsequent to the PHY header on a basis of the two pieces of information.

REFERENCE SIGNS LIST

100 communication device, AP
200 communication device, STA
110, 210 data processing unit
120, 220 control unit
130, 230 wireless communication unit

The invention claimed is:

1. A communication device comprising:
   circuitry configured to:
   set information for identifying direct link communication to a physical layer (PHY) header, the information being used for determining whether a receiving device is a target of data communication subsequent to the PHY header, before reading a media access control (MAC) header in association with the PHY header at the receiving device; and
   transmit a frame including the PHY header to the receiving device.

2. The communication device according to claim 1, wherein the circuitry is configured to connect a set of data addressed to a direct link communication adaptive device as the receiving device and transmit the connected set of data as a portion subsequent to the PHY header.

3. The communication device according to claim 1, wherein the PHY header includes a wireless communication network identifier.

4. The communication device according to claim 1, wherein the PHY header is a Physical Layer Convergence Protocol (PLCP) header.

5. The communication device according to claim 4, wherein the circuitry is configured to construct the PLCP header including at least one of direct link identification information, uplink identification information, and downlink identification information as the information for identifying direct link communication,
   wherein the uplink identification information is set in a case that the data communication is uplink communication, and the downlink identification information is set in a case that the data communication is downlink communication.

6. The communication device according to claim 4, wherein the circuitry is configured to set a first Physical Identifier (PID) to the PHY header in case that the target of the data communication belongs to own basic service set (BSS) with the communication device, and set a second PID to the PHY header in case that the target of the data communication belongs to another BSS,
   wherein the second PID is used for determination of stop receiving frame subsequent to the PHY header at the receiving device.

7. A communication device comprising:
   circuitry configured to:
   receive a physical layer (PHY) header including information for identifying direct link communication from a transmitting device;
   determine whether the communication device is a target of data communication subsequent to the PHY header based on the information, before reading a media access control (MAC) header in association with the PHY header; and
   receive the MAC header and a portion subsequent to the PHY header, when the communication device is the target of data communication subsequent to the PHY header.

8. The communication device according to claim 7, wherein the information includes uplink identification information and downlink identification information, and
   in a case in which direct link communication is identified by using the uplink identification information and the downlink identification information, the circuitry is configured to receive the portion subsequent to the PHY header on a basis of whether or not the communication device is a station.

9. The communication device according to claim 7, wherein the circuitry is configured to receive the portion subsequent to the PHY header on a basis of whether or not the communication device is adaptive to the direct link communication.

10. The communication device according to claim 7, wherein the PHY header includes a wireless communication network identifier, and
the circuitry is configured to receive the portion subsequent to the PHY header in accordance with whether or not the communication device belongs to a wireless communication network related to the wireless communication network identifier.

11. The communication device according to claim 9, wherein the circuitry is configured to stop receiving frame subsequent to the PHY header, when the communication device is not adaptive the direct link communication, or a Physical Identifier (PID) included in the PHY header indicates that the target of the data communication belongs to another basic service set (BSS) with the communication device.

12. The communication device according to claim 11, wherein the circuitry is further configured to set sleep function or network allocation vector (NAV), when reception signal strength is determined to be equal or larger than a predetermined threshold.

* * * * *